(12) United States Patent
Fialho et al.

(10) Patent No.: US 9,870,642 B2
(45) Date of Patent: Jan. 16, 2018

(54) METHOD AND APPARATUS FOR LAYOUT FOR AUGMENTED REALITY VIEW

(75) Inventors: André Tadeu Santos Fialho, Berlin (DE); Frank Gaebler, Berlin (DE); Alexandru Piukovici, Berlin (DE); Ciprian Cudalbu, Berlin (DE)

(73) Assignee: HERE Global B.V., Veldhoven (NL)

( * ) Notice: Subject to any disclaimer, the term of this patent is extended or adjusted under 35 U.S.C. 154(b) by 101 days.

(21) Appl. No.: 13/572,026

(22) Filed: Aug. 10, 2012

(65) Prior Publication Data
US 2014/0043365 A1 Feb. 13, 2014

(51) Int. Cl.
| | | |
|---|---|---|
| *G06T 3/40* | (2006.01) | |
| *G06T 3/20* | (2006.01) | |
| *G06T 15/20* | (2011.01) | |
| *G06T 19/00* | (2011.01) | |
| *G06F 3/0488* | (2013.01) | |

(52) U.S. Cl.
CPC .......... *G06T 15/20* (2013.01); *G06F 3/04883* (2013.01); *G06T 19/006* (2013.01); *G06F 2203/04806* (2013.01); *G06T 2200/24* (2013.01)

(58) Field of Classification Search
CPC ....... G06F 3/005–3/017; G06F 3/048–3/0488; G06F 2203/04806; G06T 15/20; G06T 17/05; G06T 19/00–19/006; G06T 2200/24
See application file for complete search history.

(56) References Cited

U.S. PATENT DOCUMENTS

| | | | |
|---|---|---|---|
| 2009/0228841 A1* | 9/2009 | Hildreth | G06F 3/0304 715/863 |
| 2010/0225756 A1 | 9/2010 | Miyata | |
| 2011/0249024 A1* | 10/2011 | Arrasvuori et al. | 345/629 |
| 2012/0154425 A1* | 6/2012 | Kim | G06T 19/006 345/592 |
| 2012/0176410 A1 | 7/2012 | Meier et al. | |

(Continued)

FOREIGN PATENT DOCUMENTS

| | | |
|---|---|---|
| EP | 2228625 A2 | 9/2010 |
| JP | 2004-199555 A | 7/2004 |

(Continued)

OTHER PUBLICATIONS

Notification of Transmittal of The International Search Report and The Written Opinion of The International Searching Authority, or The Declaration; International Search Report; Written Opinion for corresponding Application No. PCT/EP20131062684, dated Dec. 16, 2013, 11 pages.

(Continued)

*Primary Examiner* — Tize Ma
(74) *Attorney, Agent, or Firm* — Ditthavong & Steiner, P.C.

(57) ABSTRACT

An approach is provided for providing an interactive perspective-based point of interest layout in an augmented reality view. The layout platform determines at least one zoom level for rendering of one or more representations of one or more items in a perspective-based display based, at least in part, on at least one push interaction or at least one pull interaction in the perspective-based display. The layout platform causes, at least in part, a rendering of the one or more representations based, at least in part, on the at least one zoom level.

20 Claims, 10 Drawing Sheets

(56) References Cited

U.S. PATENT DOCUMENTS

2013/0067420 A1\* 3/2013 Pittappilly ............ G06F 3/0236
                                                     715/863
2013/0326425 A1\* 12/2013 Forstall et al. ............... 715/851

FOREIGN PATENT DOCUMENTS

| JP | 2009-088903 A | 4/2009 |
| JP | 2010-210257 A | 9/2010 |
| JP | 2011-517357 A | 6/2011 |
| WO | 2011/124757 A1 | 10/2011 |

OTHER PUBLICATIONS

Malens, "Layer, worlds first mobile Augmented Reality browser," Jun. 15, 2009, retrieved from web page https://youtube.com/watch?v=n64_16K2e08, 1 page.

Office Action for corresponding Korean Patent Application No. 2015-7006137, dated Feb. 29, 2016, 6 pages.

Office Action for corresponding Japanese Patent Application No. 2015-525789, dated Feb. 29, 2016, 6 Pages, English Language Summary Included.

Office Action for corresponding European Patent Application No. 13 732 408.3-1502 dated Aug. 31, 2016, 3 pages.

Office Action for corresponding Japanese Patent Application No. 2015-525789, dated Jul. 14, 2016, 6 pages.

Office Action for corresponding Chinese Patent Application No. 2013800423847, dated Jan. 26, 2017, English Language Summary Included, 35 pages.

Office Action for corresponding Korean Patent Application No. 2015-7006137, dated Aug. 30, 2016, 15 pages.

Office Action for corresponding Chinese Patent Application No. 201380042384.7, dated Aug. 1, 2017, 30 pages.

\* cited by examiner

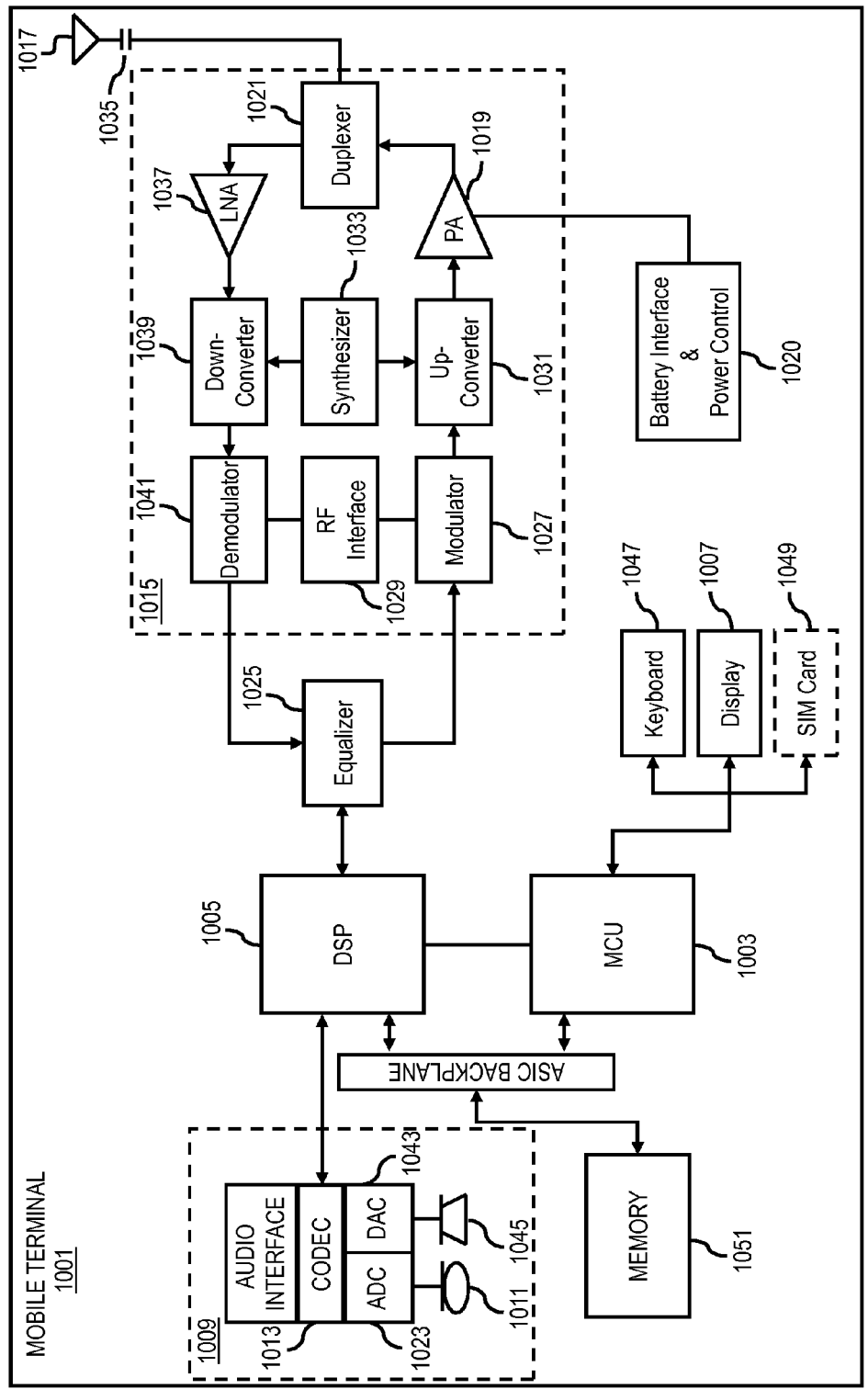

METHOD AND APPARATUS FOR LAYOUT FOR AUGMENTED REALITY VIEW

BACKGROUND

Service providers and device manufacturers (e.g., wireless, cellular, etc.) are continually challenged to deliver value and convenience to consumers by, for example, providing compelling network services. One area of interest has been the development of augmented and/or mixed reality applications (e.g., mapping and/or navigation applications) for mobile devices (e.g., mobile phones and/or tablets) that feature interactive overview information corresponding with points of interest (POIs) in a particular location (e.g., contact information, hours of operation, ratings/reviews, etc.). In particular, when the interactive content and overview information is convincingly spatially linked to corresponding POIs in the real-world environment, spatial immersion is achieved so that a user feels that the simulated world is perceptually convincing and that he or she is really "there." However, when multiple POIs are found within a scene (e.g., within a display of a mobile device), the overview information can become difficult to manage and often occludes or obstructs important parts of the scene (e.g., the POIs, pictorial depth cues, etc.). As a result, the overview information diminishes the spatial immersion potential and, therefore, the usefulness of the augmented reality application. Accordingly, service providers and device manufacturers face significant technical challenges in providing a service that effectively conveys overview information while maintaining spatial immersion in an augmented reality view.

SOME EXAMPLE EMBODIMENTS

Therefore, there is a need for an approach for providing an interactive perspective-based point of interest layout in an augmented reality view.

According to one embodiment, a method comprises at least one zoom level for rendering of one or more representations of one or more items in a perspective-based display based, at least in part, on at least one push interaction or at least one pull interaction in the perspective-based display. The method also comprises causing, at least in part, a rendering of the one or more representations based, at least in part, on the at least one zoom level.

According to another embodiment, an apparatus comprises at least one processor, and at least one memory including computer program code for one or more computer programs, the at least one memory and the computer program code configured to, with the at least one processor, cause, at least in part, the apparatus to determine at least one zoom level for rendering of one or more representations of one or more items in a perspective-based display based, at least in part, on at least one push interaction or at least one pull interaction in the perspective-based display. The apparatus also causes, at least in part, a rendering of the one or more representations based, at least in part, on the at least one zoom level.

According to another embodiment, a computer-readable storage medium carries one or more sequences of one or more instructions which, when executed by one or more processors, cause, at least in part, an apparatus to determine at least one zoom level for rendering of one or more representations of one or more items in a perspective-based display based, at least in part, on at least one push interaction or at least one pull interaction in the perspective-based display. The apparatus also causes, at least in part, a rendering of the one or more representations based, at least in part, on the at least one zoom level.

According to another embodiment, an apparatus comprises means for determining at least one zoom level for rendering of one or more representations of one or more items in a perspective-based display based, at least in part, on at least one push interaction or at least one pull interaction in the perspective-based display. The apparatus also comprises means for causing, at least in part, a rendering of the one or more representations based, at least in part, on the at least one zoom level.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 10 is a diagram of a mobile terminal (e.g., handset) that can be used to implement an embodiment of the invention.

DESCRIPTION OF SOME EMBODIMENTS

Examples of a method, apparatus, and computer program for providing an interactive perspective-based point of interest layout in an augmented reality view are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
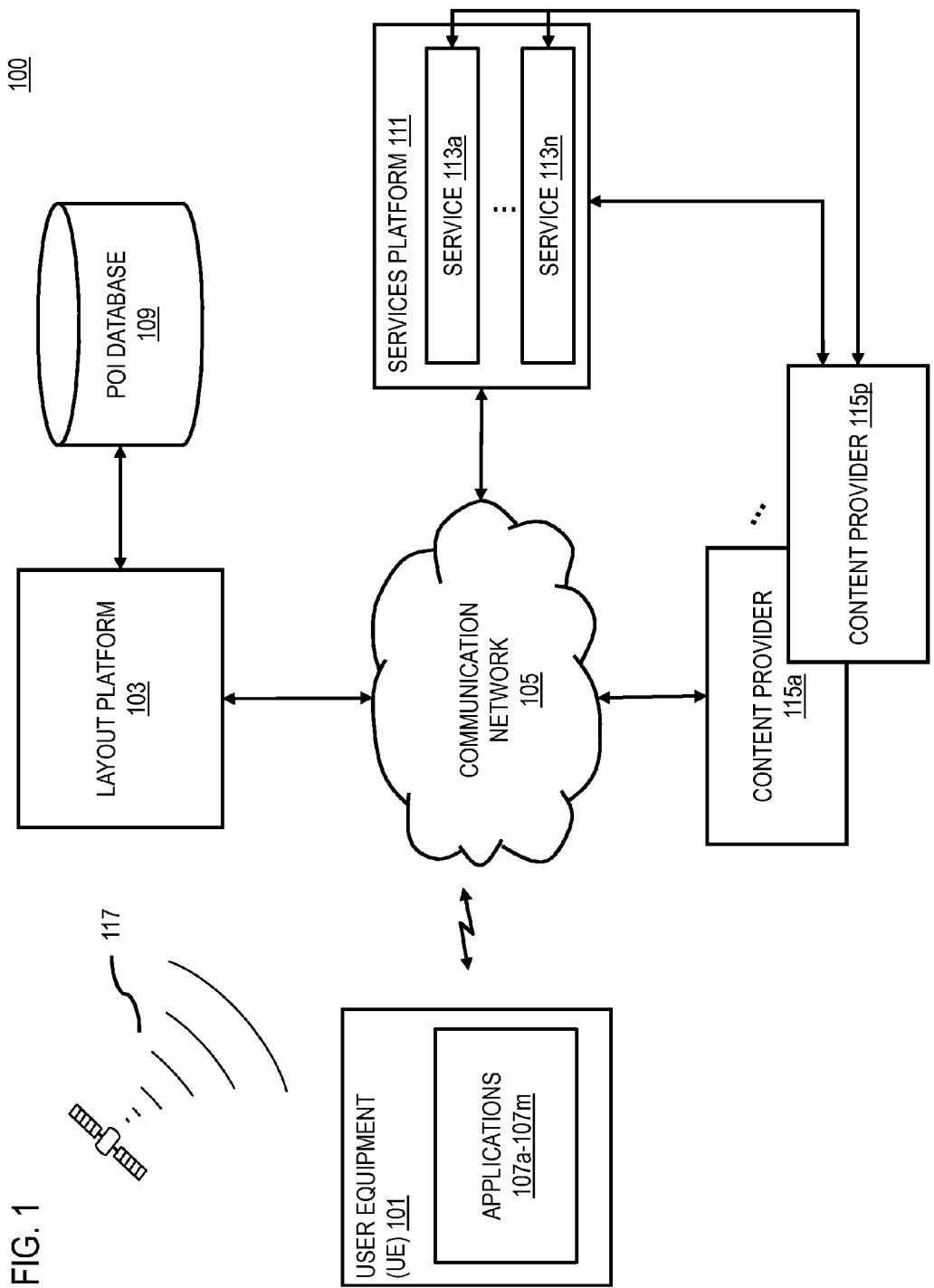
FIG. 1 is a diagram of a system capable of providing an interactive perspective-based point of interest layout in an augmented reality view, according to one embodiment.

FIG. 1 is a diagram of a system capable of providing an interactive perspective-based point of interest layout in an augmented reality view, according to one embodiment. As previously discussed, one area of interest among service providers and device manufacturers has been the development of augmented and/or mixed reality applications (e.g., mapping and/or navigation applications) for a user device, such as mobile devices (e.g., mobile phones and/or tablets), that feature interactive overview information corresponding with points of interests (POIs) in a particular location (e.g., contact information, hours of operation, ratings/reviews, etc.). More specifically, when the overview information is convincingly spatially linked to corresponding POIs in the real-world environment, spatial immersion is achieved so that a user feels that the simulated world is perceptually convincing and that he or she is really "there." However, when multiple POIs are found within a scene (e.g., within a display of a mobile device), the overview information can become difficult to manage and often occludes or obstructs important parts of the scene (e.g., the POIs, pictorial depth clues, etc.). As a result, the overview information diminishes the spatial immersion potential and, therefore, the usefulness of the augmented reality application.

To address this problem, a system 100 of FIG. 1 introduces the capability of providing an interactive perspective-based point of interest layout in an augmented reality view. In one embodiment, the system 100 first causes, at least in part, a categorization of one or more items (e.g., POIs) based, at least in part, on a distance of the one or more items from a viewing location of a perspective-based display of a user device, such as a mobile device (e.g., a mobile phone or a tablet). In particular, the one or more items include, at least in part, one or more POIs (e.g., a restaurant, a hotel, a tourist attraction, etc.) with known geographic coordinates and the perspective-based display is a mapping display that includes, at least in part, a live view, a captured panorama, a still image, a three-dimensional map (3D map), or a combination thereof. By way of example, the perspective-based display can be a touch screen. Moreover, in certain embodiments, the mapping display may also include a radar-like overview of the one or more items located within at least one bounding area or field of view (e.g., 2 m to 35 m).

In one or more embodiments, the system 100 may determine the distance of the one or more items from the viewing location based, at least in part, on a number of equidistant rows arranged by the system 100 in or on the perspective-based display (e.g., on a top, a middle, and/or a bottom perspective plane). By way of example, the "row distance" may be defined as the start and end distance thresholds for each row (e.g., the median of the distances between consecutive POIs). In addition, in one embodiment, the bottom perspective plan may include, for example, 5 rows (e.g., representing 2 m to 15 m) and the top perspective plane may include, for example, 4 or 5 rows (e.g., representing 15 m to 35 m). Further, the top and bottom planes may be defined by the system 100 using one or more of the following parameters: (1) the size of the one or more representations in pixels at the near end of the plane (top or bottom); (2) the size of the one or more representations in pixels at the far end of the plane (top or bottom); (3) the geo location of the one or more items corresponding to one or more representations; and (4) the screen boundaries of the perspective-based display.

Based, at least in part, on the determination of row distances, the system 100 characterizes the one or more items or POIs located between distance "a", where "a" is determined by the one or more items or POIs in the first row of the bottom perspective plane, and distance "a+b", where "b" is determined by the one or more items or POIs in the last row of the bottom perspective plane, as "nearby items" or "nearby POIs." The system 100 then characterizes the one or more items located between distance "a+b" and distance "c", where "c" is determined by the top perspective plane rows, as "distant items" or "distant POIs" and the one or more items located past distance "c" as "scent items" or "scent POIs."

In one embodiment, once the system 100 determines the one or more items within the bounding area (e.g., between 2 m and 35 m), the system 100 determines one or more representations of the one or items based, at least in part, on the categorization. More specifically, in one example use case, the system 100 represents the one or more scent items or scent POIs as simplified block symbols that have a lower opacity relative to the one or more other representations. In contrast, the system 100 represents the one or more distant items or distant POIs as simplified block symbols with a category glyph that is representative of the corresponding item or POI (e.g., a fork and knife, a camera, a coffee cup, a bed, etc.). Further, the system 100 represents the one or more nearby items or nearby POIs as simplified color blocks with both category details (e.g., a restaurant, a hotel, etc.) and place details (e.g., a name, a distance, a rating, etc.).

In one or more embodiments, the system 100 also determines a complexity of the one or more representations of the one or more items based, at least in part, on the categorization, the distance from the viewing location, or a combination thereof. More specifically, in addition to determining a degree of visual complexity associated with the one or more representations, the system 100 can also determine a degree of interactivity. By way of example, in one embodiment, if a user taps one or more distant items or distant POIs, the system 100 can cause, at least in part, a presentation of place details associated with the one or more representations, the one or more corresponding items, or a combination thereof (e.g., a name, a distance, a rating, etc.). Further, in one or more embodiments, if a user taps one or more nearby items or nearby POIs, the system 100 can cause, at least in part, a presentation of additional information associated with the one or more items (e.g., detail information about the item or POI). However, if a user taps one or more scent items, the system 100 will not cause a presentation of additional information associated with the one or more representations, the one or more corresponding items, or a combination thereof (i.e., the scent items are non-tappable). Nevertheless, the one or more scent items or scent POIs can still be pulled closer by a user to select the one or more items.

In one embodiment, the system 100 next determines one or more orientations of the one or more representations based, at least in part, on the viewing location, a viewing direction, or a combination thereof. In one example use case, the one or more representations are oriented by the system 100 so that the one or more representations always face a user's position and the corners of the one or more representations appear slightly rotated when facing the user. As a result, the system 100 reinforces a user's feeling of spatial immersion based, at least in part, on a 360 degree envelopment of the user viewing the perspective-based display of a mobile device (e.g., a mobile phone or a tablet).

In one or more embodiments, the system 100 then determines one or more imposition parameters (e.g., a degree of overlap, a degree of occlusion, etc.) for positioning the one or more representations, wherein the rendering of the one or more representations is based, at least in part, on the one or more interposition parameters. For example, the one or more interposition parameters enable the system 100 to control the overlapping of the one or more representations of one or more closer items (e.g., POIs) and one or more farther items so that important information (e.g., a title) is always revealed. More specifically, the system 100 arranges the fixed rows of the perspective-based display so that the vertical overlapping of the one or more representations within the rows is sufficient to provide pictorial depth clues to a user while also allowing for selection by a user of the one or more representations. By way of example, when the system 100 causes, at least in part, a vertical overlap of one or more representations, approximately 25% of the one or more representations remains visible. In contrast, when the system 100 causes, at least in part, a horizontal overlap, approximately 40% of the left or the right of the respective one or more farther representations remains visible. In addition, the system 100 causes, at least in part, a slight shift up or down of the one or more representations to reinforce visual separation. In one embodiment, the system 100 renders the one or more representations on the nearest row of the perspective plane unless the one or more representations are more distant than the current row distance (e.g., the median of the distance between consecutive POIs) or if they are significantly occluded by other one or more representations in the same row. In that case, the system 100 renders the one or more representations in the subsequent row.

In one example use case, the system 100 determines a fixed size of the one or more representations for each row (e.g., 80 px for the $1^{st}$, 70 px for the $2^{nd}$, 60 px for the $3^{th}$, 50 px for the $4^{th}$, and 40 px for the $5^{th}$ row). The system 100 can then interpolate the size of the one or more representations when the one or more representations are subjected to at least one push interaction or at least one pull interaction. After the at least one push interaction or the at least one pull interaction, the system 100 can cause, at least in part, a snapping of the one or more representations to fit the respective row layout. Moreover, in one embodiment, although the system 100 may manipulate the size of the one or more representations depending on the particular row association, the text size of the one or more representations (e.g., nearby items or nearby POIs) remains constant. In addition, the system 100 can determine to cluster one or more representations (e.g., nearby items) when the one or more representations overlap beyond a given cluster threshold (e.g., an overlap that covers over 40% of the representation) and/or when the one or more overlapping representations are within a given cluster threshold (e.g., closer than 3 m). More specifically, for each cluster, the system 100 can reveal the most relevant one of the one or more representations of the cluster and/or the number of the one or more representations within the cluster (e.g., "+3"). Further, once the system 100 determines an interaction with the cluster (e.g., a tapping), the cluster of one or more representations can expand vertically to reveal all of the one or more representations contained in the cluster.

In one or more embodiments, once the system 100 determines a layout logic of the one or more representations, the system 100 determines at least one zoom level for rendering of the one or more representations of the one items (e.g., the nearby items) in the perspective-based display based, at least in part, on at least one push interaction or at least one pull interaction in or on the perspective-based display. In particular, the at least one pull interaction enables a user to pull the one or more distant representations (e.g., scent items and/or distant items) closer and display them bigger on the display, and the at least one push interaction enables a user to push the one or more nearby representations (e.g., nearby items) into the distance and make them smaller on the display (i.e., rendering the size of the one or more representations based on their relative position in a perspective of a presentation). Moreover, the at least one push interaction or the at least one pull interaction enables a user to filter information shown in the perspective-based display according to distance. By way of further example, a user may place his or her finger or a stylus on any place of the display of a user device (e.g. a mobile phone or a tablet), with or without touching one or more representations (such as POIs) on the display, and by pulling or dragging the finger downwards on the display move the one or more representations, or one or more of groups of representations, closer in the perspective, and by pulling or dragging the finger upwards on the display move one or more representations, or one or more of groups of representations, farther in the perspective. By way of further example, movement of the one or more representations may be also actuated by upward and downward key buttons.

In one embodiment, the system 100 then determines one or more positions of the one or more representations along one or more planes of the perspective-based display based, at least in part, on the at least one zoom level, the at least one push interaction, the at least one pull interaction, or a combination thereof, wherein the rendering of the one or more representations by the system 100 is based, at least in part, on the one or more positions. As previously discussed, in one embodiment, the system 100 arranges the one or more distant representations (e.g., scent items and/or distant items) on the top plane of the perspective-based display and the one or more nearby representations (e.g., nearby items) on the bottom plane of the perspective-based display. As a result, the center area of the display remains clear of the one or more representations, allowing a user to explore the real-world environment with his or her mobile device without the one or more representations occluding or obstructing important parts of the scene (e.g., the POIs, pictorial depth clues, etc.). Moreover, the system 100 can position the one or more representations on the top or bottom plane so that the one or more representations are parallel to the horizon and the system 100 can then adjust the positioning of the one or more representations according to the position of the at least one user interface. For example, if a user tilts his or her mobile device (e.g., a mobile phone or a tablet) during a live-view display, the system 100 can adjust the positioning of the one or more representations or the entire layout in substantially real-time accordingly. In certain embodiments, the system 100 can also determine to position the one or more representations along a single perspective plane, for example, on the bottom of the perspective-based display. Further, during at least one search function, the system 100 can position the one or more representations in the perspective-based display based more on search relevancy than on distance. For example, the system 100 can position 8 of the most relevant one or more representations in the first row, then 6 of the next most relevant one or more representations in the second row, 4 in the next row, and so forth.

In one or more embodiments, the system 100 then causes, at least in part, a rendering of the one or more representations based, at least in part, on the at least one zoom level. More specifically, the system 100 causes, at least in part, the size and the opacity of the one or more representations to increase up to a point as the at least one zoom level is increased by at least one pull interaction. In particular, as the at least one zoom level for rendering the one or more nearby items or nearby POIs increases (e.g., 2 m to 0 m), the system 100 can cause, at least in part, a rendering of the one or more representations analogous to that of zooming a camera so that the size of the one or more representations increases while the opacity decreases until the one or more representations disappear out of view. Conversely, the system 100 causes, at least in part, the size and opacity of the one or more representations to decrease when the at least one zoom level is decreased by at least one push interaction. Moreover, the system 100 can cause, at least in part, a rendering of a category glyph along with the simplified block symbol as the one or more scent items cross the threshold to become one or more distant items. Likewise, as the one or more distant items cross the threshold to become one or more nearby items, the system 100 can cause, at least in part, a rendering of the one or more distant items falling from the top perspective plane to the bottom perspective plane and then expanding to reveal place details (e.g., a name, a distance, a rating, etc.). More specifically, the transition of the one or more representations (e.g., distant items) from the top perspective plane to the bottom perspective plane or vice-versa includes, at least in part, an animation by the system 100 that continuously minimizes the distance from the current state of the one or more representations (e.g., a distant item) to the target state of the one or more representations (e.g., a nearby item) and that is updated every frame in the perspective-based display. In addition, in an example use case where another at least one push interaction or at least one pull interaction is determined by the system 100 while the one or more representations are in transition from one perspective plane to the other (e.g., from the top perspective plane to the bottom perspective plane), the system 100 can stop the animation and cause, at least in part, a rendering of the animation in reverse, starting from the last state of the one or more representations in the perspective-based display.

In addition, the system 100 can cause, at least in part, a rendering of the one or more representations so that the at least one push interaction or the at least one pull interaction will move the one or more representations closer or farther from a viewing location along a trajectory of a ray cast between the viewing location and the one or more items (e.g., POIs). Further, based on the at least one pull interaction, the system 100 can cause, at least in part, a rendering of the one or more representations whereby the last row of the one or more representations moves towards the first row while the next row of the one or more representations is retrieved by the system 100 from the top plane of the perspective-based display. Moreover, it is contemplated that this process works the same way in reverse after at least one push interaction.

In one embodiment, the system 100 also causes, at least in part, a presentation of feedback information associated with the one or more representations based, at least in part, on the at least one push interaction or the at least one pull interaction. By way of example, the at least one push interaction or the at least one pull interaction may be rendered by the system 100 as a circle on the at least one user interface and the system 100 can also cause, at least in part, a rendering of an animated perspectival grid on top of the bottom perspective plane of the perspective-based display. In certain embodiments, the system 100 can also cause, at least in part, a rendering of a distance indicator or a scroll bar along with the perspectival grid. Further, the system 100 can cause, at least in part, the radar in the upper left-hand corner of the perspective-based display, for example, to change so that a user is provided with clues as to which of the one or more items or POIs are within the at least one bounding area based, at least in part, on the at least one push interaction or the at least one pull interaction.

In one or more embodiments, the system 100 can determine one or more swiping gestures with the at least one user interface. By way of example, the one or more swiping gestures may include, at least in part, a user placing his or her finger on a user interface of a mobile device (e.g., a mobile phone or a tablet) and then dragging his or her finger from one edge of the user interface to the other. In one embodiment, the system 100 then determines the one or more representations to render based, at least in part, on the one or more swiping gestures. For example, the system 100 can determine the number of the one or more representations to render or the speed by which the one or more representations move within the perspective-based display based, at least in part, on the one or more swiping gestures. More specifically, the system 100 can change all of the one or more representations on the bottom plane in a manner analogous to a page-up or a page-down function based, at least in part, on the one or more swiping gestures. Further, in one example use case, the system 100 can also determine to reset the entire view of the one or more representations based, at least in part, on the one or more swiping gestures.

In one embodiment, the system 100 can also determine at least one tapping interaction with the at least one user interface, the one or more representations, the one or more items, or a combination thereof. As previously discussed, the one or more distant items or distant POIs and the one or more nearby items or nearby POIs have a tappable functionality, but the one or more scent items or scent POIs are non-tappable elements. Consequently, the system 100 can cause, at least in part, a presentation of detail information associated with the one or more representations, the one or more items, or a combination thereof based, at least in part, on the one or more tapping interactions. More specifically, if a user taps the one or more distant items or distant POIs, the system 100 can cause, at least in part, a presentation of place details (e.g., a name, a distance, a rating, etc.) associated with the one or more corresponding items. Likewise, if a user taps the one or more nearby items or nearby POIs, the system 100 can cause, at least in part, a presentation of an about or details page associated with the one or more items that temporarily replaces the perspective-based display. For example, the details page may include an in-depth description of the one or more items. In one example use case, rather than replacing the perspective-based display, the system 100 can join the perspective-based display and the details page so that a user can move the one or more selected representations (e.g., a nearby item) to match the real-world location of the item on a portion of a map. In addition, when the system 100 causes, at least in part, a clustering of the one or more representations (e.g., nearby items or nearby POIs), and the system 100 renders the cluster as an expanded stack, if a user taps the at least one user interface somewhere other than where the stack is located, the system 100 can cause, at least in part, the expanded stack to return back to a cluster.

In certain embodiments, the system 100 can also cause, at least in part, a rendering of one or more building-based occlusion models to diminish noise in a particular scene or view. By way of example, the system 100 can cause, at least in part, a covering of one or more buildings or POIs with a semi-transparent mask based on one or more image recognition technologies. More specifically, the system 100 can enable a user to tap the one or more models to determine additional content associated with a building, a POI, or a combination thereof (e.g., contact information, hours of operation, ratings/reviews, etc.).

As shown in FIG. 1, the system 100 comprises a user equipment (UE) 101 (e.g., a mobile phone or a tablet) having connectivity to a layout platform 103 via a communication network 105. The UE 101 may include or be associated with one or more applications 107a-107m (also collectively referred to as applications 107). By way of example, the applications 107 may include an augmented and/or mixed reality application, a mapping and/or navigation application, a social networking application, etc.

In one embodiment, the layout platform 103 may include or be associated with at least one POI database 109. In one example embodiment, the layout platform 103 may exist in whole or in part within the UE 101, or independently, and the POI database 109 may exist in whole or in part within the layout platform 103, or independently. The POI database 109 may include one or more representations of the one or more items or POIs (e.g., scent items, distant items, and/or nearby items) and one or more building-based occlusion models. The POI database 109 may also include one or more captured images, captured panoramas, or a combination thereof. In addition, the POI database 109 also may include one or more POI layouts, POI layout logics, or a combination thereof for determining the one or more positions of the one or more representations in the perspective-base display. Further, the POI database 109 may also include one or more place details and one or more about or details pages corresponding to one or more items or POIs.

The UE 101 is also connected to a services platform 111 via the communication network 105. The services platform 111 includes one or more services 113a-113n (also collectively referred to as services 113). The services 113 may include a wide-variety of content provisioning services for the applications 107. By way of example, the services 113 may include mapping services, navigation services, search related services, social networking services (e.g., ratings/reviews of POIs), location-based services, etc. The UE 101, the services platform 111, and the services 113 also have connectivity to one or more content providers 115a-115p (also collectively referred to as content providers 115). The content providers 115 also may provision a wide variety of content (e.g., about or detail pages) to the components of the system 100.

In certain embodiments, the layout platform 103 one or more of the applications 107 may utilize location-based technologies (e.g., global positioning system (GPS), cellular triangulation, Assisted GPS (A-GPS), etc.) to determine the location of the UE 101. For example, a UE 101 may include a GPS receiver to obtain geographic coordinates from satellites 117 to determine its current location relative to one or more items or POIs in the nearby vicinity. In addition, the one or more applications 107 may make a request to one or more of the services 113 and/or the content providers 115 for location-based data (e.g., POIs, distances, maps, etc.) based on a position relative to the UE 101.

By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of user terminal, mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In one embodiment, the layout platform 103 first causes, at least in part, a categorization of one or more items based, at least in part, on a distance from a viewing location of a perspective-based display of the UE 101 (e.g., a mobile phone or a tablet). More specifically, the one or more items include, at least in part, one or more POIs (e.g., a restaurant, a hotel, a tourist attraction, etc.) with known geographic coordinates and the perspective-based display is a mapping display that includes, at least in part, a live view, a captured panorama, a still image, or a combination thereof. In addition, the layout platform 103 may determine the distance of the one or more items from the viewing location based, at least in part, on a number of equidistant rows arranged by the layout platform 103 on a top and a bottom perspective plane, for example, of the perspective-based display. As a result, the layout platform 103 characterizes the one or more items located between distance "a" and distance "a+b" as nearby items or nearby POIs; the one or more items located between distance "a+b" and distance "c" as distant items or distant POIs; and the one or more items located past distance "c" as scent items or scent POIs.

In one embodiment, once the layout platform 103 determines the one or more items within the bounding area (e.g., between 2 m and 35 m), the layout platform 103 determines one or more representations of the one or more items based, at least in part, on the categorization. As previously discussed, the layout platform 103 can represent the one or more scent items or scent POIs as simplified block symbols that have a lower opacity relative to the one or more other representations. In contrast, the layout platform 103 can represent the one or more distant items as simplified block symbols with a category glyph and the one or more nearby items as simplified color blocks with both category glyphs and place details.

In one or more embodiments, the layout platform 103 determines a complexity of the one or more representations of the one or more items based, at least in part, on the categorization, the distance from the viewing location, or a combination thereof. More specifically, in addition to determining a degree of visual complexity associated with the one or more representations, the layout platform 103 can also determine a degree of interactivity with the one or more representations. For example, in one embodiment, if a user taps one or more distant items, the layout platform 103 can cause, at least in part, a presentation of place details associated with the representation, the one or more corresponding items or POIs, or a combination thereof (e.g., a name, a distance, a rating, etc.). Further, in one or more embodiments, if a user taps one or more nearby items, the layout platform 103 can cause, at least in part, a presentation of additional information associated with the one or more items (e.g., detail information about the item or POI). However, if a user taps one or more scent items, the layout platform 103 will not cause a presentation of additional information associated with the one or more representations, the one or more corresponding items or POIs, or a combination thereof (i.e., the scent items are non-tappable). Nevertheless, the one or more scent items can still be pulled by a user closer to select the one or more items.

In one embodiment, the layout platform 103 next determines one or more orientations of the one or more representations based, at least in part, on the viewing location, a viewing direction, or a combination thereof. In one example use case, the one or more representations are oriented by the layout platform 103 so that the one or more representations always face a user's position and the corners of the one or more representations appear slightly rotated when facing the user. In addition to the orientation of the one or more representations, the layout platform 103 also determines one or more interposition parameters (e.g., a degree of overlap, a degree of occlusion, etc.) for positioning the one or more representations, wherein the rendering of the one or more representations is based, at least in part, on the one or more interposition parameters. As previously discussed, the layout platform 103 arranges the one or more organizational rows of the perspective-based display so that the vertical overlapping of the one or more representations within the rows is sufficient to provide pictorial depth clues to a user without overlaying important information and also while allowing for selection by the user of the one or more representations.

In one or more embodiments, once the layout platform 103 determines a layout logic of the one or more representations, the layout platform 103 can determine at least one push interaction or at least one pull interaction with the at least one user interface of the UE 101. The layout platform 103 next determines at least one zoom level for rendering the one or more representations of the one or more items (e.g., the nearby items) in the perspective-based display of the UE 101 based, at least in part, on the at least one push interaction or the at least one pull interaction. As previously discussed, the at least one pull interaction enables a user to pull the one or more distant representations (e.g., scent items and/or distant items) closer and the at least one push interaction enables a user to push the one or more nearby representations (e.g., nearby items) into the distance.

In one embodiment, the layout platform 103 then determines one or more positions of the one or more representations along one or more planes of the perspective-based display of the UE 101 based, at least in part, on the at least one zoom level, the at least one push interaction, the at least one pull interaction, or a combination thereof, wherein the rendering of the one or more representations by the layout platform 103 is based, at least in part, on the one or more positions. In particular, in one embodiment, the layout platform 103 arranges the one or more distant representations (e.g., scent items and/or distant items) on the top plane of the perspective-based display and the one or more nearby representations (e.g., nearby items) on the bottom plane of the display. As a result, the center area of the perspective-based display remains clear of the one or more representations.

In one or more embodiments, the layout platform 103 then causes, at least in part, a rendering of the one or more representations based, at least in part, on the at least one zoom level. More specifically, the layout platform 103 causes, at least in part, the size and the opacity of the one or more representations to increase up to a point as the at least one zoom level is increased by at least one pull interaction. Conversely, the layout platform 103 causes, at least in part, the size and the opacity of the one or more representations to decrease when the at least one zoom level is decreased by at least one push interaction. Moreover, the layout platform 103 can cause, at least in part, a rendering of a category glyph along with the simplified block symbol as the one or more scent items cross the threshold to become one or more distant items. Similarly, as the one or more distant items cross the threshold to become one or more nearby items, the layout platform 103 can cause, at least in part, a rendering of the one or more distant items falling from the top perspective plane to the bottom perspective plane and then expanding to reveal place details (e.g., a name, a distance, a rating, etc.). More specifically, the transition of the one or more representations (e.g., distant items) from the top perspective plane to the bottom perspective plane or vice-versa includes, at least in part, an animation by the layout platform 103 that continuously minimizes the distance from the current state of the one or more representations (e.g., a distant item) to the target state of the one or more representations (e.g., a nearby item) and that is updated every frame in the perspective-based display. In addition, in an example use case where another at least one push interaction or at least one pull interaction is determined by the layout platform 103 while the one or more representations are in transition from one perspective plane to the other (e.g., from the top perspective plane to the bottom perspective plane), the layout platform 103 can stop the animation and cause, at least in part, a rendering of the animation in reverse, starting from the last state of the one or more representations in the perspective-based display.

In addition, the layout platform 103 can cause, at least in part, a rendering of the one or more representations so that the at least one push interaction or the at least one pull interaction will move the one or more representations closer or farther from a viewing location following a trajectory of a ray cast between the viewing location and the one or more items (e.g., POIs). Moreover, based on the at least one pull interaction, the layout platform 103 can cause, at least in part, a rendering of the one or more representations so that the last row of the one or more representations moves towards the first row while the next row of the one or more representations is retrieved by the layout platform 103 from the top plane of the perspective-based display. As previously discussed, it is contemplated that this process works the same way in reverse after at least one push interaction.

In one embodiment, the layout platform 103 also causes, at least in part, a presentation of feedback information associated with the one or more representations based, at least in part, on the at least one push interaction or the at least one pull interaction. By way of example, the at least one push interaction or the at least one pull interaction may be rendered by the layout platform 103 as a circle in the user interface and the layout platform 103 can also cause, at least in part, a rendering of an animated perspectival grid on top of the bottom perspective plane of the perspective-based display. Further, the layout platform 103 can cause, at least in part, the radar in the upper left-hand corner of the perspective-based display, for example, to change so that a user is provided with clues as to which of the one or more items or POIs is within the at least one bounding area based, at least in part, on the at least one push interaction or the at least one pull interaction.

In one or more embodiments, the layout platform 103 can determine one or more swiping, tapping, pushing, pulling and/or dragging gestures with the at least one user interface of the UE 101 (e.g., a mobile phone or a tablet). Based, at least in part, on the one or more swiping gestures, for example, the layout platform 103 can then determine the one or more representations to render. By way of example, the layout platform 103 can determine the number of the one or more representations to render or the speed by which the one or more representations move within the perspective-based display based, at least in part, on the one or more swiping gestures. In addition, the layout platform 103 can also determine at least one tapping interaction with the at least one user interface, the one or more representations, the one or more items, or a combination thereof. More specifically, if a user taps the one or more distant items or distant POIs, the layout platform 103 can cause, at least in part, a presentation of place details associated with the one or more items. Similarly, if a user taps the one or more nearby items or nearby POIs, the layout platform 103 can cause, at least in part, a presentation of an about or details page associated with the one or more items. As previously discussed, the details page may include an in-depth description of the one or more items.

In certain embodiments, the layout platform 103 can also cause, at least in part, a rendering of one or more building-based occlusion models to diminish noise in a particular scene or view. Further, the layout platform 103 can cause, at least in part, a covering of one or more buildings or POIs with a semi-transparent mask based on one or more image recognition technologies. In addition, the layout platform 103 can enable a user to tap one of the one or more models to determine content associated with a building, a POI, or a combination thereof (e.g., contact information, hours of operation, ratings/reviews, etc.).

By way of example, the UE 101, layout platform 103, the services platform 111, the content providers 115, and the satellites 117 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
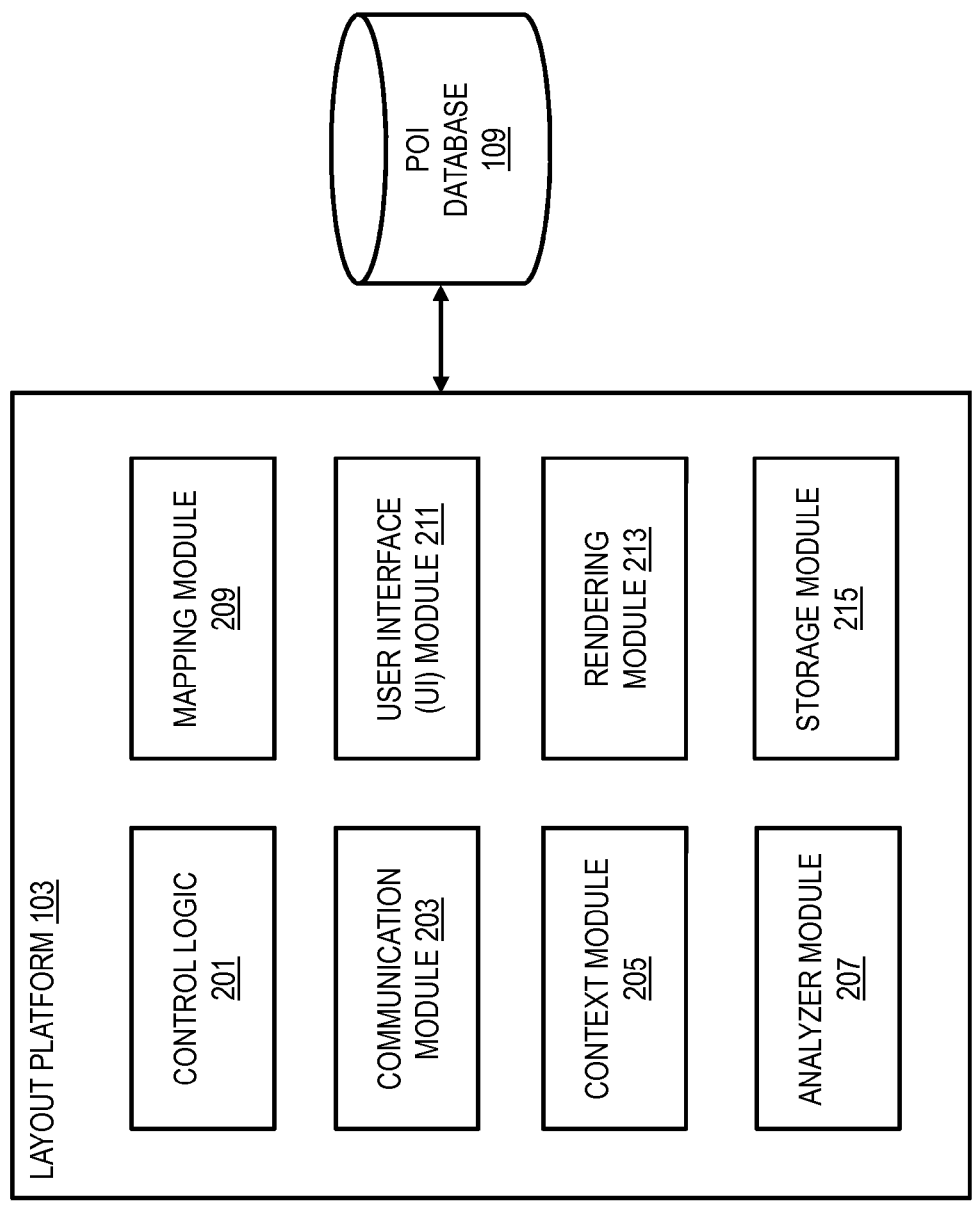
FIG. 2 is a diagram of the components of a layout platform, according to one embodiment.

FIG. 2 is a diagram of the components of a layout platform 103, according to one embodiment. By way of example, the layout platform 103 includes one or more components for providing an interactive perspective-based point of interest layout in an augmented reality view. It is contemplated that the functions of these components may be combined in one or more components or performed by other components of equivalent functionality. In this embodiment, the layout platform 103 includes a control logic 201, a communication module 203, a context module 205, an analyzer module 207, a mapping module 209, a user interface (UI) module 211, a rendering module 213, and a storage module 215.

The control logic 201 oversees tasks, including tasks performed by the communication module 203, the context module 205, the analyzer module 207, the mapping module 209, the UI module 211, the rendering module 213, and the storage module 215. For example, although the other modules may perform the actual task, the control logic 201 may determine when and how those tasks are performed or otherwise direct the other modules to perform the task. The communication module 203 is used for communication between the UE 101, the layout platform 103, the applications 107, the POI database 109, the services platform 111, the services 113, the content providers 115, and the satellites 117. The communication module 203 may also be used to communicate commands, requests, data, etc.

The context module 205 is used to cause, at least in part, a categorization of the one or more items (e.g., POIs) based, at least in part, on a distance from a viewing location of the perspective-based display. More specifically, in one embodiment, the context module 205 characterizes the one or more items as scent items, distant items, or nearby items based, at least in part, on a number of equidistant rows arranged by the context module 205 on a top and a bottom perspective plane, for example, of a perspective-based display. The context module 205 also may be used to determine one or more orientations of the one or more representations based, at least in part, on a viewing location, a viewing direction, or a combination thereof.

The analyzer module 207 is used to determine the one or more representations of the one or more items (e.g., POIs) based, at least in part, on the categorization of the one or more items (e.g., scent items, distant items, and/or nearby items). The analyzer module 207 may also be used to determine a complexity of the one or more representations based, at least in part, on the categorization, the distance of the viewing location, or a combination thereof. For example, the analyzer module 207 may determine which of the one or more representations have a tapping functionality.

The mapping module 209 is used determine to determine one or more interposition parameters (e.g., a degree of overlap, a degree of occlusion, etc.) for positioning the one or more representations. For example, the mapping module 209 can control an overlapping of the one or more representations of one or more closer items and one or more farther items so that pictorial depth clues are provided without overlaying important information (e.g., a title). The mapping module 209, in connection with the UI module 211, may also be used to determine at least one zoom level for rendering the one or more representations of the one or more items in the perspective-based display based, at least in part, on the at least one push interaction or the at least one pull interaction. Further, the mapping module 209 may also be used to determine one or more positions of the one or more representations along one or more planes of the perspective-based display based, at least in part, on the at least one zoom level, the at least one push interaction, the at least one pull interaction, or a combination thereof. More specifically, in one embodiment, the mapping module 209 arranges the one or more distant representations (e.g., scent items and/or distant items) on the top plane of the perspective-based display and the one or more nearby representations (e.g. nearby items) on the bottom plane of the perspective-based display.

The user interface (UI) module 211 is used to determine at least one push interaction or at least one pull interaction with the at least one user interface depicting a perspective-based display. By way of example, a user may place his or her finger or a stylus on any place of the display of a user device (e.g. a mobile phone or a tablet), with or without touching one or more representations (such as POIs) on the display, and by pulling or dragging the finger downwards on the display move the one or more representations, or one or more of groups of representations, closer in the perspective, and by pulling or dragging the finger upwards on the display move one or more representations, or one or more of groups of representations, farther in the perspective. By way of further example, movement of the one or more representations may be also actuated by upward and downward key buttons. The UI module 211 may also be used to determine one or more swiping gestures with the at least one user interface. For example, the one or more swiping gestures may include, at least in part, a user placing his or her finger on a user interface of a mobile device and then dragging his or her finger from one edge of the user interface to the other. The UI module 211 also may be used to determine at least one tapping interaction with the at least one user interface, the one or more representations (e.g., scent items, distant items, ad/or nearby items), the one or more items (e.g., POIs), or a combination thereof. Further, the UI module 211 may also be used to cause, at least in part, a presentation of detail information associated with the one or more representations, the one or more items, or a combination thereof based, at least in part, on the one or more tapping interactions.

The rendering module 213 is used to cause, at least in part, a rendering of the one or more representations (e.g., scent items, distant items, and/or nearby items) based, at least in part, on the at least one zoom level. For example, the rendering module 213 causes, at least in part, the size and the opacity of the one or more representations to increase up to a point as the at least one zoom level is increased by the at least one pull interaction. Conversely, the rendering module 213 causes, at least in part, the size and the opacity of the one or more representations to decrease when the at least one zoom level is decreased by the at least one push interaction. In addition, the rendering module 213 causes, at least in part, an increase or a decrease in the visual complexity of the of the one or more representations based, at least in part, on the location of the one of more representations. The rendering module 213 may also be used to cause, at least in part, a presentation of feedback information associated with the one or more representations based, at least in part, on the at least one push interaction or the at least one pull interaction. Further, the rendering module 213 also may be used to determine the one or more representations to render based, at least in part, on the one or more swiping gestures.

The storage module 215 is used to manage the storage of the one or more representations of the one or more items or POIs (e.g., scent items, distant items, and/or nearby items) and one or more building-based occlusion models stored in the POI database 109. The storage module 215 may also be used to manage the storage of the one or more captured images, the one or more captured panoramas, or a combination thereof stored in the POI database 109. In addition, the storage module 215 also may be used to manage the storage of the one or more POI layouts, the one or more POI layout logics, or a combination thereof stored in the POI database 109. Further, the storage module 215 may also be used to manage the storage of the one or more place details and the one or more about or details pages stored in the POI database 109.

Figure 3:
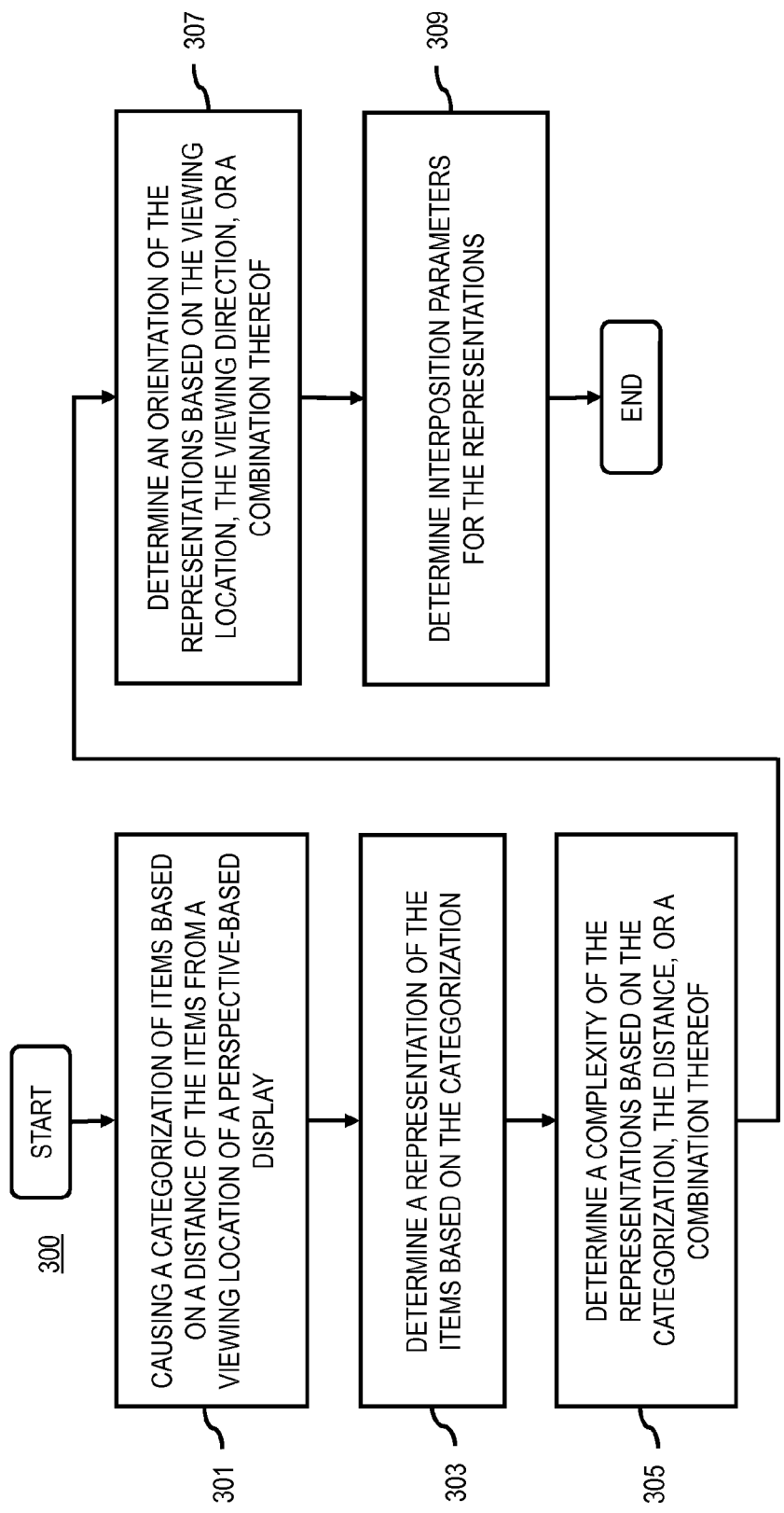
FIGS. 3-5 are flowcharts of processes for providing an interactive perspective-based point of interest layout in an augmented reality view, according to one embodiment.
Figure 4:
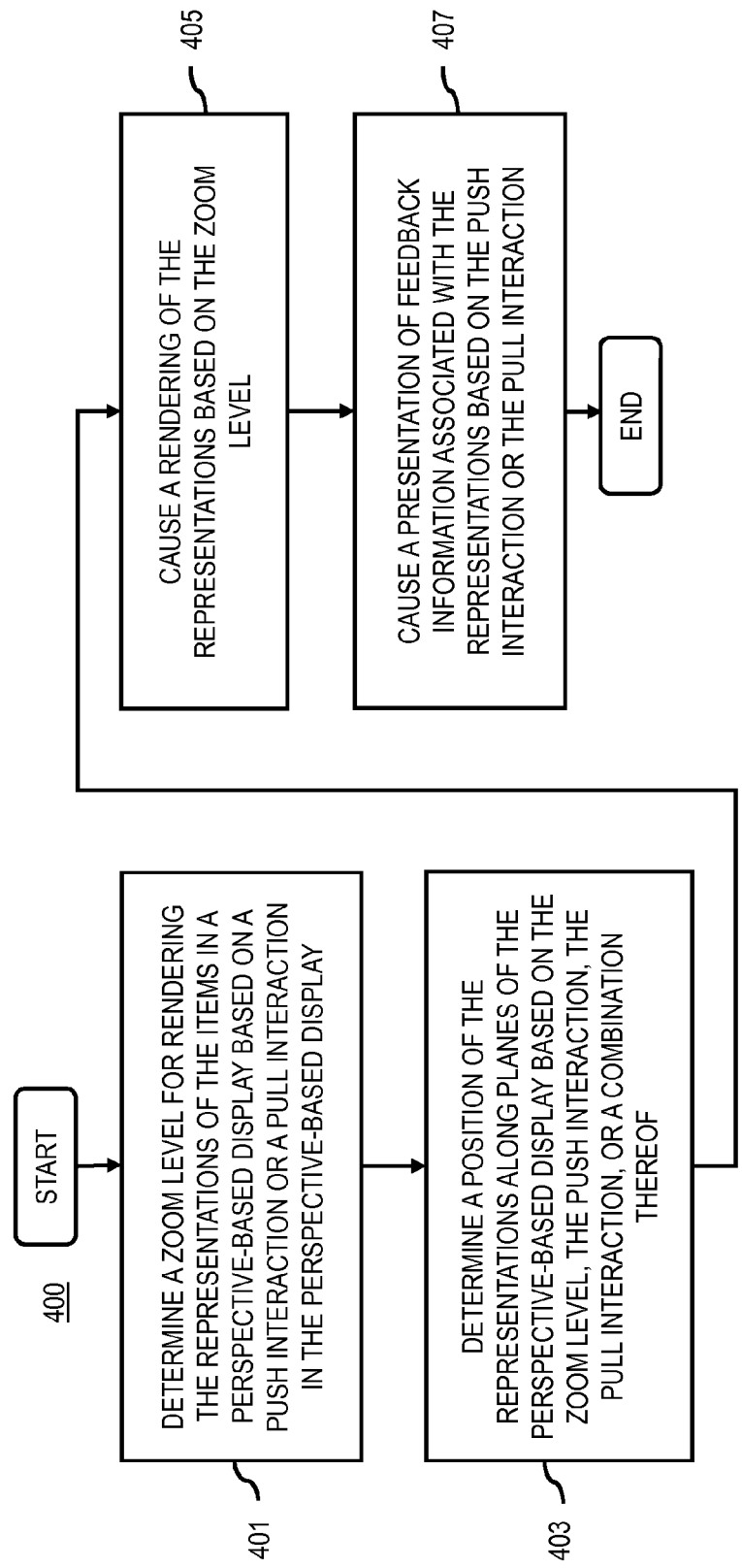
Figure 5:
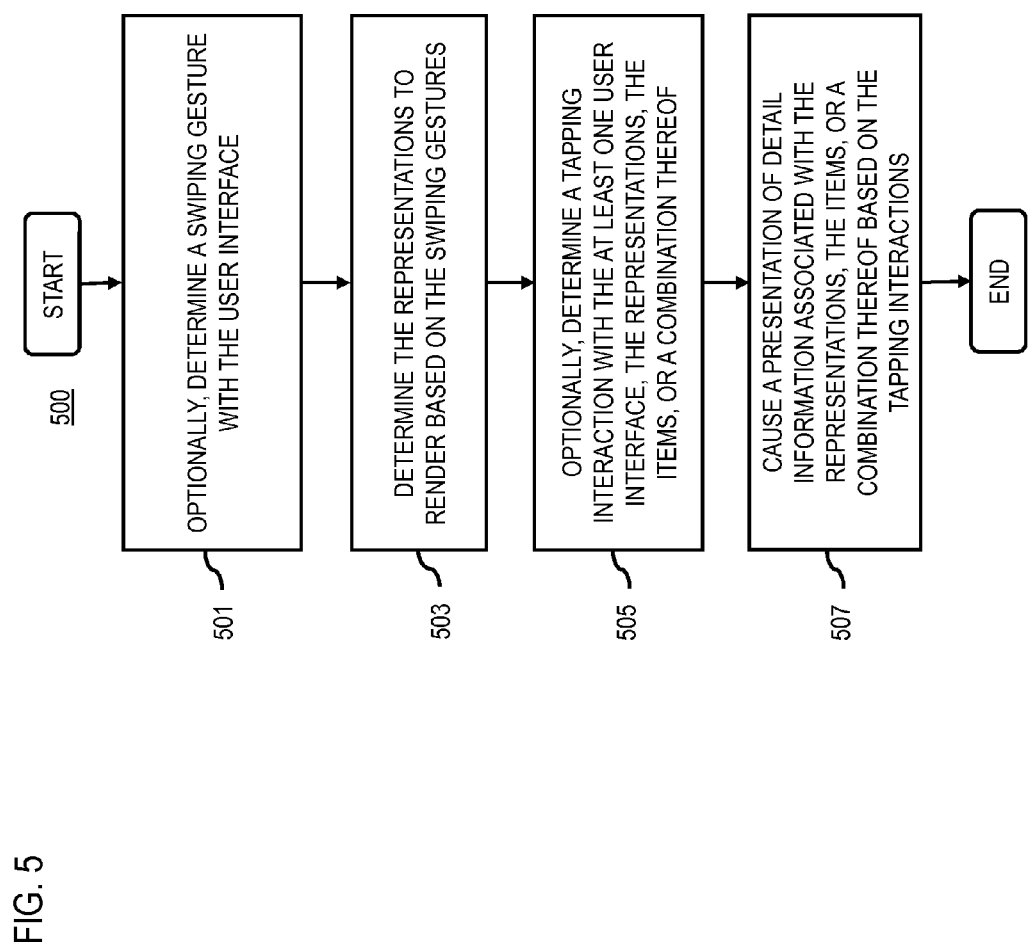
Figure 9:
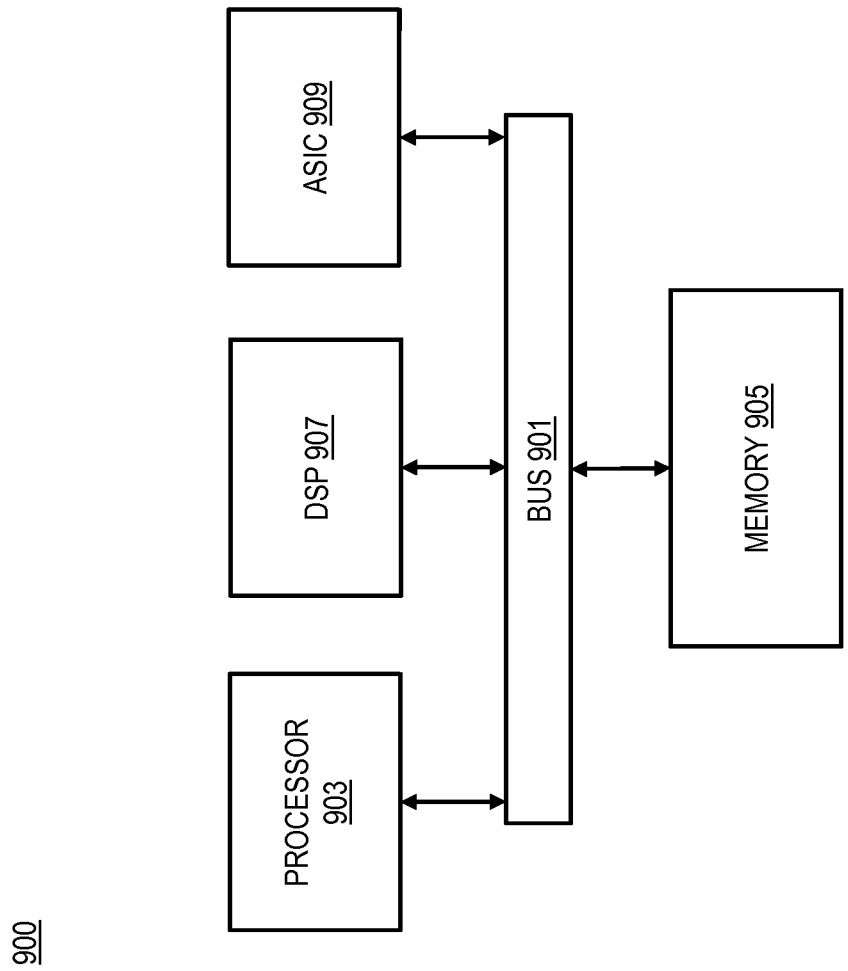
FIG. 9 is a diagram of a chip set that can be used to implement an embodiment of the invention.

FIGS. 3-5 are flowcharts of processes for providing an interactive perspective-based point of interest layout in an augmented reality view, according to one embodiment. FIG. 3 depicts a process 300 of determining a layout logic of the one or more representations. In one embodiment, the layout platform 103 performs the process 300 and is implemented in, for instance, a chip set including a processor and a memory as shown in FIG. 9. In step 301, the layout platform 103 causes, at least in part, a categorization of the one or more items based, at least in part, on a distance of the one or more items from a viewing location of the perspective-based display. By way of example, the one or more items include, at least in part, one or more POIs (e.g., a restaurant, a hotel, a tourist attraction, etc.) and the perspective-based display is a mapping display that includes, at least in part, a live view, a captured panorama, a still image, a 3D map, or a combination thereof. In addition, the layout platform 103 may determine the distance of the one or more items from the viewing location based, at least in part, on a number of equidistant rows arranged by the layout platform 103 on a top and a bottom perspective plane, for example, of the perspective-based display. Moreover, the top and bottom planes may be defined by layout platform 103 using one or more of the following parameters: (1) the size of the one or more representations in pixels at the near end of the plane (top or bottom); (2) the size of the one or more representations in pixels at the far end of the plane (top or bottom); (3) the geo location of the one or more items corresponding to one or more representations; and (4) the screen boundaries of the perspective-based display. As a result, the layout platform 103 characterizes the one or more items located between distance "a" and distance "a+b" as nearby items or nearby POIs; the one or more items located between distance "a+b" and distance "c" as distant items or distant POIs; and the one or more items located past distance "c" as scent items or scent POIs.

In step 303, the layout platform 103 determines the one or more representations of the one or more items based, at least in part, on the categorization. By way of example, in one embodiment, the layout platform 103 represents the one or more scent items or scent POIs as simplified color block symbols that have a lower opacity relative to the one or more other representations. In contrast, the layout platform 103 represents the one or more distant items or distant POIs as simplified color blocks with a category glyph that is representative of the corresponding item or POI (e.g., a fork and knife, a camera, a coffee shop, a bed, etc.). Further, the layout platform 103 represents the one or more nearby items or nearby POIs as simplified colors blocks with both category glyphs and place details (e.g., a name, a distance, a rating, etc.).

In step 305, the layout platform 103 determines a complexity of the one or more representations based, at least in part, on the categorization, the distance from the viewing location, or a combination thereof. More specifically, in addition to determining a degree of visual complexity associated with the one or more representations, the layout platform 103 can also determine a degree of interactivity. For example, in one embodiment, if a user taps one or more distant items or distant POIs, the layout platform 103 can cause, at least in part, a presentation of place details associated with the one or more representations, the one or more corresponding items, or a combination thereof (e.g., a name, a distance, a rating, etc.). Further, in one or more embodiments, if a user taps one or more nearby items or nearby POIs, the layout platform 103 can cause, at least in part, a presentation of additional information associated with the one or more items (e.g., detail information about the item or POI). However, if a user taps the one or more scent items, the layout platform 103 will not to cause a presentation of additional information associated with the one or more representations, the one or more corresponding items, or a combination thereof (i.e., the scent items are non-tappable). Nevertheless, the one or more scent items can still be pulled closer by a user to select the one or more items.

In step 307, the layout platform 103 determines one or more orientations of the one or more representations based, at least in part, on the viewing location, a viewing direction, or a combination thereof. In one example use case, the one or more representations are oriented by the layout platform 103 so that the one or more representations always face a user's position and the corners of the one or more representations appear slightly rotated when facing the user. Consequently, the layout platform 103 reinforces a user's feeling of spatial immersion based, at least in part, on a 360 degree envelopment of the user viewing the perspective-based display of a mobile device (e.g., a mobile phone or tablet).

In step 309, the layout platform 103 determines one or more interposition parameters for positioning the one or more representations, wherein the rendering of the one or more representations is based, at least in part, on the one or more interposition parameters. By way of example, the one or more imposition parameters may include a degree of overlap, a degree of occlusion, etc. Moreover, the one or more imposition parameters enable the layout platform 103 to control an overlapping of the one or more representations of one or more closer items (e.g., POIs) and one or more farther items so that important information (e.g., a title) is always revealed. More specifically, the layout platform 103 arranges the fixed rows of the perspective-based display so that the vertical overlapping of the one or more representations within the rows is sufficient to provide pictorial depth clues to a user without overlaying important information and also while allowing for selection by the user of the one or more representations. By way of example, when the layout platform 103 causes, at least in part, a vertical overlap of one or more representations, approximately 25% of the one or more representations remains visible. In contrast, when the layout platform 103 causes, at least in part, a horizontal overlap, approximately 40% of the left or the right of the respective one or more farther representations remains visible. In addition, the layout platform 103 causes, at least in part, a slight shift up or down of the one or more representations to reinforce visual separation. Further, in one embodiment, the layout platform 103 can also determine to cluster one or more representations (e.g., one or more nearby items) when the one or more representations overlap beyond a given cluster threshold (e.g., an overlap that covers over 40% of the representation) and/or when the one or more overlapping representations are within a given cluster threshold (e.g., closer than 3 m). In particular, for each cluster, the layout platform 103 may reveal the most relevant of the one or more one or more representations of the cluster and/or the number of representations within the cluster (e.g., "+3").

FIG. 4 depicts a process 400 of determining one or more primary interactions with at least one user interface of a mobile device (e.g., a mobile phone or a tablet). In one embodiment, the layout platform 103 performs the process 400 and is implemented in, for instance, a chip set including a processor and a memory as shown in FIG. 9. In step 401, the layout platform 103 determines at least one zoom level for rendering of one or more representations of one or more items in a perspective-based display based, at least in part, on at least one push interaction or at least one pull interaction in the perspective-based display. By way of example, as previously discussed, a user may place his or her finger or a stylus on any place of the display of a user device (e.g. a mobile phone or a tablet), with or without touching one or more representations (such as POIs) on the display, and by pulling or dragging the finger downwards on the display move the one or more representations, or one or more of groups of representations, closer in the perspective and make the one or more representations bigger. Conversely, a user, by pulling or dragging his or her finger upwards on the display, may move one or more representations, or one or more of groups of representations, farther in the perspective and make the one or more representations smaller. By way of further example, movement of the one or more representations may be also actuated by upward and downward key buttons. In addition, the at least one push interaction or the at least one pull interaction enables a user to filter information shown in the perspective-based display according to distance in perspective.

In step 403, the layout platform 103 determines one or more positions of the one or more representations along one or more planes of the perspective-based display based, at least in part, on the at least one zoom level, the at least one push interaction, the at least one pull interaction, or a combination thereof, wherein the rendering of the one or more representations is based, at least in part, on the one or more positions. In one example use case, the layout platform 103 can arrange the one or more distant representations (e.g., scent items and/or distant items) on the top plane of the perspective-based display and the one or more nearby representations (e.g., nearby items) on the bottom plane of the perspective-based display. Consequently, the center area of the display remains clear of the one or more representations, allowing a user to explore the real-world environment with a mobile device without the one or more representations occluding or obstructing important parts of the scene (e.g., the POIs, pictorial depth clues, etc.). Moreover, the layout platform 103 can position the one or more representations on the top or the bottom plane so that the one or more representations are parallel to the horizon and the layout platform 103 can also adjust the positioning of the one or more representations according to the position of the at least one user interface. By way of example, if a user tilts his or her mobile device (e.g., a mobile phone or a tablet) during a live view display, the layout platform 103 can adjust the positioning of the one or more representations or the entire layout in substantially real-time accordingly. In certain embodiments, the layout platform 103 can also determine to position the one or more representations along a single perspective plane on the bottom of the perspective-based display.

In step 405, the layout platform 103 causes, at least in part, a rendering of the one or more representations based, at least in part, on the at least one zoom level. By way of example, the layout platform 103 causes, at least in part, the size and the opacity of the one or more representations to increase up to a point as the at least one zoom level is increased by at least one pull interaction. More specifically, as the at least one zoom level for rendering the one or more nearby items or nearby POIs increases (e.g., 2 m to 0 m), the layout platform 103 can cause, at least in part, a rendering of the one or more representations analogous to that of zooming a camera so that the size of the one or more representations increases while the opacity decreases until the one or more representations disappears out of view. Conversely, the layout platform 103 causes, at least in part, the size and the opacity of the representations to decrease as the at least one zoom level is decreased by at least one push interaction. Moreover, the layout platform 103 can cause, at least in part, a rendering of a category glyph along with the simplified block symbol as the one or more scent items cross the threshold to become one or more distant items. Likewise, as the one or more distant items cross the threshold to become one or more nearby items, the layout platform 103 can cause, at least in part, a rendering of the one or more distant items falling from the top perspective plane to the bottom perspective plane and then expanding to reveal place details (e.g., a name, a distance, a rating, etc.). More specifically, the transition of the one or more representations from the top perspective plane to the bottom perspective plane or vice-versa includes, at least in part, an animation by the layout platform 103 that continuously minimizes the distance from the current state of the one or more representations (e.g., a distant item) to the target state of the one or more representations (e.g., a nearby item) and that is updated every frame in the perspective-based display. In addition, in an example use case where another at least one push interaction or at least one pull interaction is determined by the layout platform 103 while the one or more representations are in transition from one perspective plane to the other (e.g., from the top perspective plane to the bottom perspective plane), the layout platform 103 can stop the animation and cause, at least in part, a rendering of the animation in reverse, starting from the last state of the one or more representations in the perspective-based display.

In addition, the layout platform 103 can cause, at least in part, a rendering of the one or more representations so that the at least one push interaction or the at least one pull interaction will move the one or more representations closer or farther from a viewing location along a trajectory of a ray cast between the viewing location and the one or more items. Further, based on the at least one pull interaction, the layout platform 103 can cause, at least in part, a rendering of the one or more representations whereby the last row of the one or more representations moves towards the first row while the next row of the one or more representations is retrieved by the layout platform 103 from the top plane of the perspective-based display. Moreover, it is contemplated that this process works the same way in reverse after at least one push interaction.

In step 407, the layout platform 103 causes, at least in part, a presentation of feedback information associated with the one or more representations based, at least in part, on the at least one push interaction or the at least one pull interaction. By way of example, the at least one push interaction or the at least one pull interaction may be rendered by the layout platform 103 as a circle on the at least one user interface and the layout platform 103 can also cause, at least in part, a rendering of an animated perspectival grid on top of the bottom perspective plane of the perspective-based display. In certain embodiments, the layout platform 103 can further cause, at least in part, a rendering of a distance indicator or a scroll bar along with the perspective grid. In addition, the layout platform 103 can cause, at least in part, the radar in the upper left-hand corner of the perspective-based display, for example, to change so that a user is provided with clues as to which of the one or more items of POIs are within the at least one bounding area based, at least in part, on the at least one push interaction or the at least one pull interaction.

FIG. 5 depicts a process 500 of determining one or more secondary interactions with at least one user interface of a mobile device. In one embodiment, the layout platform 103 performs the process 500 and is implemented in, for instance, a chip set including a processor and a memory as shown in FIG. 9. In step 501, the layout platform 103 determines one or more swiping gestures with the at least one user interface. By way of example, as previously discussed, the one or more swiping gestures may include, at least in part, a user placing his or her finger on a user interface of a mobile device (e.g., a mobile phone or a tablet) and then dragging his or her finger from one edge of the user interface to the other. Then in step 503, the layout platform 103 determines the one or more representations to render based, at least in part, on the one or more swiping gestures. For example, the layout platform 103 can determine the number of the one or more representations to render or the speed by which the one or more representations move within the perspective-based display based, at least in part, on the one or more swiping gestures. More specifically, the layout platform 103 can change all of the one or more representations on the bottom plane in a manner similar to a page-up or a page-down function based, at least in part, on the one or more swiping gestures. Further, in one example use case, the layout platform 103 can also determine to reset the entire view of the one or more representations based, at least in part, on the one or more swiping gestures.

In step 505, the layout platform 103 determines at least one tapping interaction with the at least one user interface, the one or more representations, the one or more items, or a combination thereof. As previously discussed, in one embodiment, the one or more distant items or distant POIs and the one or more nearby items or nearby POIs have a tappable functionality, but the one or more scent items or scent POIs are non-tappable elements. Moreover, in certain embodiments, the layout platform 103 can also cause, at least in part, a rendering of one or more building-based occlusion models to diminish noise in a particular scene or view and the one or more building-based occlusion models, the one or more buildings, or a combination thereof may also have a tappable functionality.

In step 507, the layout platform 103 causes, at least in part, a presentation of detail information associated with the one or more representations, the one or more items, or a combination thereof based, at least in part, on the one or more tapping interactions. By way of example, if a user taps one or more distant items, the layout platform 103 can cause, at least in part, a presentation of place details (e.g., a name, a distance, a rating, etc.) associated with the one or more corresponding items. Likewise, if a user taps one or more nearby items, the layout platform 103 can cause, at least in part, a presentation of an about or details page associated with the one or more items, replacing the perspective-based display. For example, the details page may include an in-depth description of the one or more items. As previously discussed, in one example use case, rather than replacing the perspective-based display, the layout platform 103 can join the perspective-based display and the details page so that a user can move the one or more selected representations (e.g., a nearby item) to match the real-world location of the item on a portion of a map. Moreover, in the embodiments with one or more building-based occlusion models, if a user taps the one or more models, the one or more buildings, or a combination thereof, the layout platform 103 can cause, at least in part, a presentation of additional content associated with the building, the POI, or a combination thereof (e.g., contact information, hours of operation, ratings/reviews, etc.).

Figure 6:
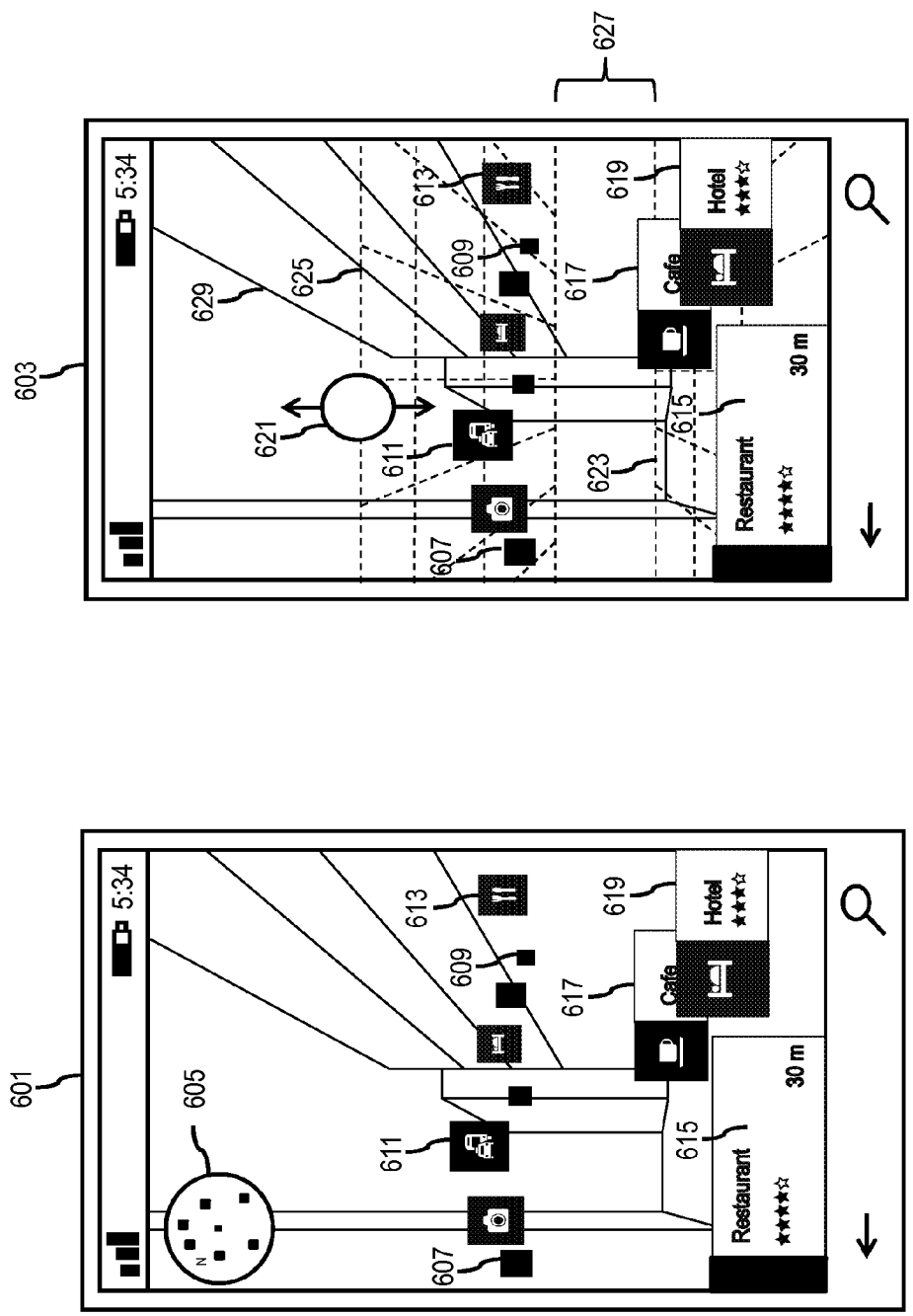
FIG. 6 is a diagram of user interfaces utilized in the processes of FIGS. 3-5, according to various embodiments.

FIG. 6 is a diagram of user interfaces utilized in the processes of FIGS. 3-5, according to various embodiments. As shown, the example user interfaces of FIG. 6 include one or more user interface elements and/or functionalities created and/or modified based, at least in part, on information, data, and/or signals resulting from the processes (e.g., process 300, 400, and 500) described with respect to FIGS. 3-5. More specifically, FIG. 6 illustrates two user interfaces (e.g., interfaces 601 and 603) depicting one or more representations of one or more items (e.g., POIs) and corresponding feedback information in a perspective-based display.

In one embodiment, the system 100 first causes, at least in part, a categorization of one or more items (e.g., POIs) based, at least in part, on a distance of the one or more items from a viewing location of the perspective-based display of interfaces 601 and 603 (e.g., a mobile phone). More specifically, the one or more items include, at least in part, one or more POIs (e.g., a restaurant, a hotel, a café, etc.) with known geographic coordinates and the perspective-based display of interfaces 601 and 603 is a mapping display that includes, at least in part, a live view, a captured panorama, a still image, or a combination thereof. In certain embodiments, the mapping display may also include a radar-like overview 605 of the one or more items located within the at least one bounding area or field of view (e.g., 2 m to 35 m). As previously discussed, the system 100 may determine the distance of the of the one or more items from the viewing location based, at least in part, on a number of equidistant rows arranged by the system 100 on a top and a bottom perspective plane, for example, of the perspective-based display. As a result, the system 100 characterizes the one or more items located between distance "a" and distance "a+b" as nearby items or nearby POIs; the one or more items located between distance "a+b" and distance "c" as distant items or distant POIs; and the one or more items located past distance "c" as scent items or scent POIs.

In one embodiment, once the system 100 determines the one or more items within the bounding area, the system 100 determines one or more representations of the one or more items based, at least in part, on the categorization. By way of example, the system 100 can represent one or more scent items 607 and 609 as simplified block symbols that have a lower opacity relative to the one or more other representations. In contrast, the system 100 can represent the one or more distant items 611 and 613 as simplified block symbols with a category glyph (e.g., transportation, a fork and knife, etc.) and the one or more nearby items 615, 617, and 619 as simplified color blocks with both category glyphs and place details (e.g., a name, a distance, a rating, etc.). For example, nearby item 615 as depicted in interface 601 represents a restaurant 30 meters away from the viewing location with a four out of five stars rating. As previously discussed, in addition to determining a degree of visual complexity associated with the one or more representations (e.g., scent item 609 compared to nearby item 615), the system 100 can also determine a degree of interactivity with the one or more representations. By way of example, in one embodiment, if a user taps the distant item 611, for example, the system 100 can cause, at least in part, a presentation of place details associated with the representation, the corresponding item (e.g., a transportation hub), or a combination thereof. Further, in one or more embodiments, if a user taps the nearby item 615, for example, the system 100 can cause, at least in part, a presentation of additional information associated with the item (e.g., a menu). However, if a user taps the scent item 607, for example, the system 100 will not cause a presentation of additional information associated with the representation, the corresponding item (e.g., a pharmacy) or a combination thereof.

In one or more embodiments, the system 100 next determines one or more orientations of the one or more representations (e.g., nearby items 615, 617, and 619) based, at least in part, on the viewing location, a viewing direction, or a combination thereof. In this example use case, the one or more representations (e.g., nearby items 615, 617, and 619) are oriented by the system 100 so that the one or more representations face a user's position and the corners of the one or more representations appear slightly rotated when facing the user. In addition to the orientation of the one or more representations, the system 100 determines one or more imposition parameters (e.g., a degree of overlap, a degree of occlusion, etc.) for positioning the one or more representations. As previously discussed, the system 100 arranges the fixed rows of the perspective-based display so that the vertical overlapping of the one or more representations (e.g., nearby items 615, 617, and 619) is sufficient to provide pictorial depth clues to a user without overlaying important information (e.g., titles) and while allowing for selection by the user of the one or more representations. More specifically, in this example use case, nearby item 615 is closer to the viewing location than nearby item 617 and although nearby item 619 is closer to the viewing location than nearby item 617, it is still apparent the title of the that nearby item 617 is "café."

Figure 7:
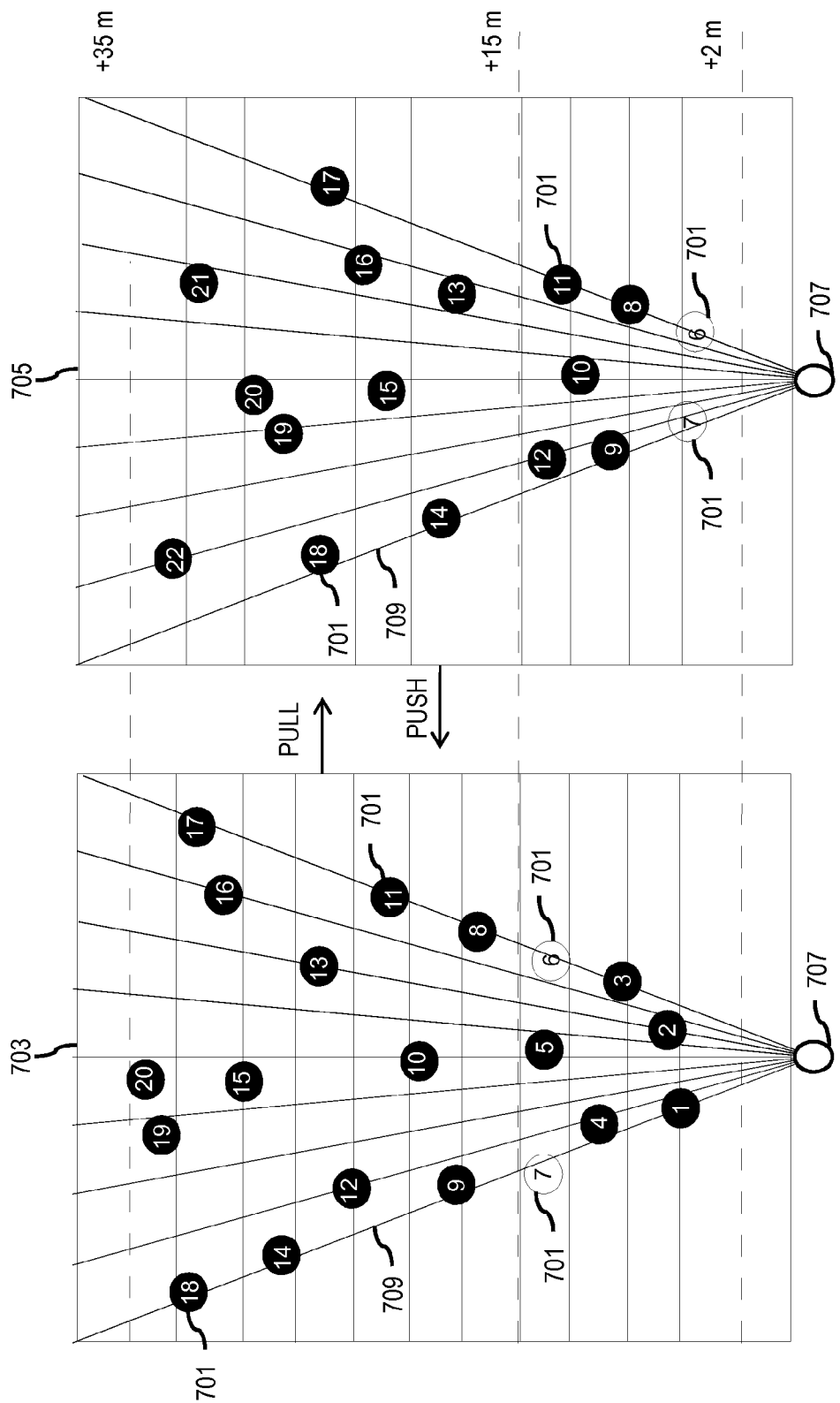
FIG. 7 is a diagram of a top view of the processes of FIGS. 3 and 4, according to various embodiments.

In one or more embodiments, once the system 100 determines a layout logic of the one or more representations, the system 100 determines at least one zoom level for rendering the one or more representations of the items in the perspective-based display of interfaces 601 and 603 based, at least in part, on at least one push interaction or at least one pull interaction in the perspective-based display. By way of example, the at least one push interaction or the at least one pull interaction may be rendered by the system 100 as a circle 621 in the interface 601 and the system 100 can also cause, at least in part, a rendering of an animated perspectival grid 623 on top of the bottom perspective plane of the perspective-based display. An illustrative example of the at least one push interaction or at least one pull interaction is depicted in FIG. 7. In particular, as previously discussed, the at least one pull interaction enables a user of interface 603 to pull the one or more distant representations (e.g., scent items 607 and 609 and/or distant items 611 and 613) closer and make the one or more representations bigger and the at least one push interaction enables a user of interface 603 to push the one or more nearby representations (e.g., nearby items 615, 617, and 619) into the distance and make the one or more representations smaller.

In one embodiment, the system 100 then determines one or more positions of the one or more representations along one or more planes of the perspective-based display based, at least in part, on the at least one zoom level, the at least one push interaction, the at least one pull interaction, or a combination thereof, wherein the rendering of the one or more representations is based, at least in part, on the one or more positions. As previously discussed, in one embodiment, the system 100 arranges the one or more distant representations (e.g., scent items 607 and 609 and distant items 611 and 613) on the top plane 625 of the perspective-based display and the one or more nearby representations (e.g., nearby items 615, 617, and 619) on the bottom plane 623 of the display. In particular, the top plane 625 and the bottom plane 623 may be defined by the layout platform 103 using one or more of the following parameters: (1) the size of the one or more representations (e.g., distant item 611) in pixels at the near end of the plane (top or bottom); (2) the size of the one or more representations in pixels at the far end of the plane (top or bottom); (3) the geo location of the one or more items corresponding to one or more representations; and (4) the screen boundaries of the perspective-based display (e.g., interfaces 601 and 603). As a result, the center area 627 of the perspective-based display remains clear of the one or more representations, allowing a user to explore the real-world environment with the interfaces 601 and 603 without the one or more representations occluding or obstructing important parts of the scene (e.g., the POIs, pictorial depth clues, etc.).

In one or more embodiments, the system 100 then causes, at least in part, a rendering of the one or more representations based, at least in part, on the at least one zoom level. More specifically, the system 100 causes, at least in part, the size and the opacity of the one or more representations to increase up to a point (e.g., nearby item 615 compared to nearby item 619) as the at least one zoom level is increased by at least one pull interaction. Moreover, the system 100 can cause, at least in part, a rendering of a category glyph along with the simplified block symbol (e.g., as depicted in distant item 613) as the one or more scent items (e.g., scent item 609) crosses the threshold to become one or more distant items (e.g., distant item 613). In addition, as the one or more distant items (e.g., distant item 613) cross the threshold to become one or more nearby items (e.g., nearby item 615), the system 100 can cause, at least in part, a rendering of the one or more distant items falling from the top perspective plane 625 and then expanding to reveal place details (e.g., as depicted in nearby item 615). More specifically, the transition of the one or more representations from the top perspective plane to the bottom perspective plane or vice-versa includes, at least in part, an animation by the system 100 that continuously minimizes the distance from the current state of the one or more representations (e.g., distant item 613) to the target state of the one or more representations (e.g., nearby item 615) and that is updated every frame in the perspective-based display. In addition, in an example use case where another at least one push interaction or at least one pull interaction is determined by the system 100 while the one or more representations are in transition from one perspective plane to the other (e.g., from the top perspective plane to the bottom perspective plane), the system 100 can stop the animation and cause, at least in part, a rendering of the animation in reverse, starting from the last state of the one or more representations in the perspective-based display.

In one embodiment, the system 100 can also determine one or more swiping gestures with the interfaces 601 and 603. Based, at least in part, on the one or more swiping gestures (e.g., swiping interface 603), the system 100 can then determine the one or more representations to render. By way of example, the system 100 can change all of the one or more representations on the bottom plane 623 in a manner analogous to a page-up or a page-down function based, at least in part, on the one or more swiping gestures. As previously discussed, the system 100 can also determine at least one tapping interaction with the interface 603, the one or more representations (e.g., distant item 611 or nearby item 615), the one or more items (e.g., building 629), or a combination thereof. More specifically, if a user taps the one or more distant items (e.g., distant items 611 and 613), the system 100 can cause, at least in part, a presentation of place details (e.g., a name, a distance, a rating, etc.) associated with the one or more items. Likewise, if a user taps the one or more nearby items (e.g., nearby items 615, 617, and 619), the system 100 can cause, at least in part, a presentation of an about or details page associated with the one or more items. Further, in certain embodiments, the system 100 can enable a user to tap the one or more buildings (e.g., building 629) to determine additional content associated with a building, a POI, or a combination thereof (e.g., contact information, hours of operation, etc.).

FIG. 7 is a diagram of a top view of the processes of FIGS. 3 and 4, according to various embodiments. As shown, FIG. 7 illustrates at least one push interaction or at least one pull interaction with a user interface of a perspective-based display (e.g., interfaces 601 and 603). As previously discussed, the system 100 can cause, at least in part, a rendering of the one or more representations 701 so that the at least one push interaction as depicted by diagram 703 or the at least one pull interaction as depicted by diagram 705 will move the one or more representations 701 closer or farther from a viewing location 707 along a trajectory of a ray 709 between the viewing location 707 and the one or more items (e.g., a POI). Moreover, based on the at least one pull interaction 705, the system 100 can cause, at least in part, a rendering of the one or more representations 701 so that the last row of the one or more displaced representations (e.g., representations numbered 19 and 20 of diagram 703) moves towards the first row while the next row of the one or more representations (e.g., representations numbered 21 and 22 of diagram 705) is retrieved by the system 100 from the top plane of the perspective-based display.

The processes described herein for providing an interactive perspective-based point of interest layout in an augmented reality view may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
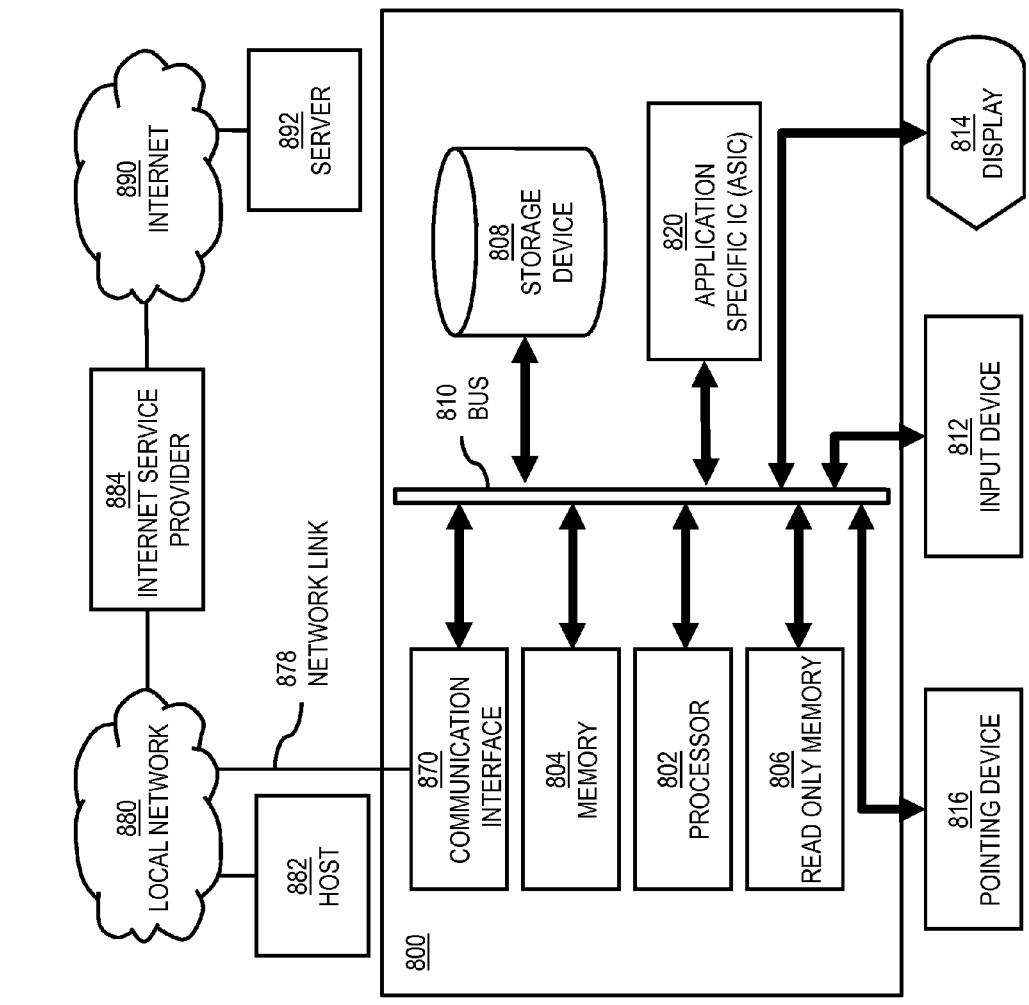
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to provide an interactive perspective-based point of interest layout in an augmented reality view as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of providing an interactive perspective-based point of interest layout in an augmented reality view.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to provide an interactive perspective-based point of interest layout in an augmented reality view. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for providing an interactive perspective-based point of interest layout in an augmented reality view. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for providing an interactive perspective-based point of interest layout in an augmented reality view, is provided to the bus 810 for use by the processor from an external input device 812, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, a touch screen, or a printer for presenting text or images, and a pointing device 816, such as a mouse, a trackball, cursor direction keys, a touch screen, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 for providing an interactive perspective-based point of interest layout in an augmented reality view to the UE 101.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to provide an interactive perspective-based point of interest layout in an augmented reality view as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of providing an interactive perspective-based point of interest layout in an augmented reality view.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide an interactive perspective-based point of interest layout in an augmented reality view. The memory 905 also stores the data associated with or generated by the execution of the inventive steps.

FIG. 10 is a diagram of exemplary components of a mobile terminal (e.g., handset) for communications, which is capable of operating in the system of FIG. 1, according to one embodiment. In some embodiments, mobile terminal 1001, or a portion thereof, constitutes a means for performing one or more steps of providing an interactive perspective-based point of interest layout in an augmented reality view. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of providing an interactive perspective-based point of interest layout in an augmented reality view. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to provide an interactive perspective-based point of interest layout in an augmented reality view. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   initiating, by an apparatus, a rendering on a user interface of an initial representation of a plurality of points of interest within a field of view of a perspective-based display when viewing from a geographic location of the perspective-based display;
   determining, by the apparatus, a plurality of zoom levels on the perspective-based display, wherein each of the zoom levels corresponds to a respective augmented granularity level of size and glyph information details as well as a respective one of a plurality of geographic distance ranges from the geographic location of the perspective-based display;
   grouping, by the apparatus, the plurality of points of interest in to a plurality of groups of points of interest based on the geographic distance ranges;
   in response to at least one pull interaction on the user interface, initiating, by the apparatus, a pulling-in of one or more representations of one or more of the points of interest that are shown in a farther zoom level in the initial representation from a farther distance range into a closer distance range with respect to the perspective-based display, by transitioning the one or more representations into a closer zoom level, while maintaining the zoom level of other ones of the points of interest that are not pulled to a different distance range in a subsequent representation of the perspective-based display.

2. A method of claim 1, further comprising:
   determining positions of geographic distance ranges in the initial representation using planes of the perspective-based display,
   wherein the planes include at least a top plane, a middle plane, a bottom plane, and the one or more points of interest are shifted across the planes.

3. A method of claim 1, further comprising:
   as the at least one pull interaction continues, continuing the pulling-in of the one or more representations of the one or more of the points of interest until the one or more representations disappear from the subsequent representation of the perspective-based display.

4. A method of claim 1, further comprising:
   including in the user interface a representation of a top overview of the points of interest located within a predetermined distance from the geographic location of the perspective-based display; and
   changing the top overview in the subsequent representation in response to the at least one push interaction or the at least one pull interaction.

5. A method of claim 1, further comprising:
   determining an orientation of the initial representation based at least on the geographic location, the field of view, or a combination thereof,
   wherein the initial representation includes a group of nearby points of interest showing a zoom level of high details and being located between the bottom plane and the middle plane, a group of distant points of interest showing a zoom level of medium details and being located between the middle plane and the top plane, and a group of scent points of interest showing a zoom level of low details and being located above the top plane.

6. A method of claim 5, wherein the subsequent representation excludes the group of nearby points of interest, pulls in the group of distant points of interest between the bottom plane and the middle plane to show the zoom level of high details, and pulls in the group of scent points of interest between the middle plane and the top plane to show the zoom level of medium details, in response to the at least one pull interaction.

7. A method of claim 1, further comprising:
   in response to at least one push interaction on the user interface, initiating a pushing-out of one or more representations of one or more of the points of interest that are shown in a closer zoom level in the initial representation from a closer distance range into a farther distance range with respect to the perspective-based display, by transitioning the one or more representations into a farther zoom level, while maintaining the zoom level of other ones of the points of interest that are not pushed to a different distance range in a subsequent representation of the perspective-based display; and
   determining one or more interposition parameters for positioning the initial representation,
   wherein the rendering of the initial representation is based at least on the one or more interposition parameters.

8. A method of claim 1, further comprising:
   determining one or more swiping gestures with respect to the subsequent representation on the perspective-based display; and
   initiating a transition to another subsequent representation of the perspective-based display that shifts one or more of the points of interest into a next geographic distance range and a corresponding zoom level in response to the one or more swiping gestures, while maintaining the zoom level of other ones of the points of interest that are not swiped to a different distance range.

9. A method of claim 1, further comprising:
   determining at least one tapping interaction with respect to the subsequent representation on the perspective-based display; and
   initiating a transition to another subsequent representation of the perspective-based display that shifts one or more of the points of interest into a next geographic distance range and a corresponding zoom level in response to the one or more tapping interactions, while maintaining the zoom level of other ones of the points of interest that are not tapped to a different distance range.

10. A method of claim 1, further comprising:
    initiating a presentation of feedback information associated with the subsequent representation based at least on the at least one pull interaction.

11. An apparatus comprising:
    at least one processor; and
    at least one memory including computer program code for one or more programs,
    the at least one memory and the computer program code configured to, with the at least one processor, cause the apparatus to perform at least the following,
    initiate a rendering on a user interface of an initial representation of a plurality of points of interest within a field of view of a perspective-based display when viewing from a geographic location of the perspective-based display;
    determine a plurality of zoom levels on the perspective-based display, wherein each of the zoom levels corresponds to a respective augmented granularity level of size and glyph information details as well as a respective one of a plurality of geographic distance ranges from the geographic location of the perspective-based display;

group the plurality of points of interest in to a plurality of groups of points of interest based on the geographic distance ranges;

in response to at least one pull interaction on the user interface, initiate a pulling-in of one or more representations of one or more of the points of interest that are shown in a farther zoom level in the initial representation from a farther distance range into a closer distance range with respect to the perspective-based display, by transitioning the one or more representations into a closer zoom level, while maintaining the zoom level of other ones of the points of interest that are not pulled to a different distance range in a subsequent representation of the perspective-based display.

12. An apparatus of claim 11, wherein the apparatus is further caused to:

determine positions of geographic distance ranges in the initial representation using planes of the perspective-based display, wherein the planes include at least a top plane, a middle plane, a bottom plane, and the one or more points of interest are shifted across the planes.

13. An apparatus of claim 11, wherein the apparatus is further caused to:

as the at least one pull interaction continues, continue the pulling-in of the one or more representations of the one or more of the points of interest until the one or more representations disappear from the subsequent representation of the perspective-based display.

14. An apparatus of claim 11, wherein the apparatus is further caused to:

determine a complexity of the one or more representations based at least on the geographic distance ranges.

15. An apparatus of claim 11, wherein the apparatus is further caused to:

determine one or more orientations of the one or more representations based at least on the geographic location, a viewing direction, or a combination thereof.

16. An apparatus of claim 11, wherein the apparatus is further caused to:

determine one or more interposition parameters for positioning the one or more representations, wherein the one or more representations are rendered based at least on the one or more interposition parameters.

17. An apparatus of claim 11, wherein the apparatus is further caused to:

determine one or more swiping gestures with the at least one user interface, wherein the one or more representations are rendered based at least on the one or more swiping gestures.

18. An apparatus of claim 11, wherein the apparatus is further caused to:

determine at least one tapping interaction with the at least one user interface, the one or more representations, the one or more points of interest, or a combination thereof; and initiate a presentation of detail information associated with the one or more representations, the one or more points of interest, or a combination thereof based at least on the one or more tapping interactions.

19. An apparatus of claim 11, wherein the apparatus is further caused to:

initiate a presentation of feedback information associated with the one or more representations based on the at least one pull interaction.

20. An apparatus of claim 11, wherein the perspective-based display is a mapping display.

* * * * *